(12) United States Patent
Gao

(10) Patent No.: US 11,888,547 B2
(45) Date of Patent: Jan. 30, 2024

(54) COUPLING DEVICE, SURFACE WAVE COUPLING METHOD AND OPEN WIRE SURFACE WAVE WIRELESS COVERAGE SYSTEM

(71) Applicant: ZTE CORPORATION, Guangdong (CN)

(72) Inventor: Hua Gao, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 501 days.

(21) Appl. No.: 17/192,900

(22) Filed: Mar. 5, 2021

(65) Prior Publication Data

US 2021/0266040 A1 Aug. 26, 2021

Related U.S. Application Data

(63) Continuation of application No. PCT/CN2019/082282, filed on Apr. 11, 2019.

(30) Foreign Application Priority Data

Sep. 5, 2018 (CN) .......................... 201811033366.3

(51) Int. Cl.
*H04B 3/56* (2006.01)
*H01P 3/10* (2006.01)
*H04B 3/58* (2006.01)

(52) U.S. Cl.
CPC ................ *H04B 3/56* (2013.01); *H01P 3/10* (2013.01); *H04B 3/58* (2013.01); *H04B 2203/5441* (2013.01); *H04B 2203/5483* (2013.01)

(58) Field of Classification Search
CPC .... H04B 3/56; H04B 3/58; H04B 2203/5441; H04B 2203/5483; H04B 2203/5491; H04B 3/52; H01P 3/10; H01P 5/08
(Continued)

(56) References Cited

U.S. PATENT DOCUMENTS 8,497,749 B2 7/2013 Elmore
9,509,415 B1 11/2016 Henry et al.
(Continued)

FOREIGN PATENT DOCUMENTS

CN 105900344 A 8/2016
CN 105981225 A 9/2016
(Continued)

OTHER PUBLICATIONS

ZTE Corporation, Extended European Search Report, EP 19858193.6, dated Oct. 4, 2021, 7 pgs.
(Continued)

*Primary Examiner* — Nam V Nguyen
(74) *Attorney, Agent, or Firm* — CANTOR COLBURN LLP

(57) ABSTRACT

Provided are a coupling device, a surface wave coupling method, and an open wire surface wave wireless coverage system. The coupling device comprises: a high-order mode direct coupling module configured to couple a first electromagnetic wave from a transmitter to form a second electromagnetic wave propagating in a preset high-order guided wave mode; a mode converting and filtering module configured to convert the second electromagnetic wave into a third electromagnetic wave propagating in a superposition of a plurality of guided wave modes, and to filter the high-order guided wave mode in the third electromagnetic wave to obtain a fourth electromagnetic wave propagating in the preset low-order guided wave mode; and a mode matching
(Continued)

module configured to convert the fourth electromagnetic wave into a fifth electromagnetic wave propagating along a surface of an open wire in a target guided wave mode.

20 Claims, 12 Drawing Sheets

(58) Field of Classification Search
USPC .................. 340/12.32; 375/211, 219, 316
See application file for complete search history.

(56) References Cited

U.S. PATENT DOCUMENTS

| | | | |
|---|---|---|---|
| 9,705,561 B2 | 7/2017 | Henry et al. | |
| 10,200,106 B1* | 2/2019 | Barzegar | H04B 1/40 |
| 10,205,231 B1* | 2/2019 | Henry | H04B 3/52 |
| 10,284,261 B1* | 5/2019 | Barzegar | H01P 5/04 |
| 10,405,199 B1* | 9/2019 | Henry | H04B 7/0469 |
| 10,439,675 B2* | 10/2019 | Johnson | H04B 3/56 |
| 10,446,936 B2* | 10/2019 | Henry | H04B 3/58 |
| 10,665,942 B2* | 5/2020 | Henry | H01Q 3/34 |
| 10,812,136 B1* | 10/2020 | Henry | H04B 3/36 |
| 10,886,589 B1* | 1/2021 | Rappaport | H04M 3/007 |
| 2016/0112132 A1 | 4/2016 | Gerszberg et al. | |
| 2016/0112135 A1 | 4/2016 | Henry et al. | |
| 2016/0380328 A1 | 12/2016 | Henry et al. | |
| 2017/0047633 A1 | 2/2017 | Lee et al. | |
| 2019/0141714 A1* | 5/2019 | Willis, III | H04L 27/26 |

FOREIGN PATENT DOCUMENTS

| | | |
|---|---|---|
| CN | 106605332 A | 4/2017 |
| CN | 107005271 A | 8/2017 |
| CN | 107005277 A | 8/2017 |
| CN | 107005278 A | 8/2017 |
| CN | 107078759 A | 8/2017 |
| JP | 2017505557 A | 2/2017 |
| WO | 2016171914 A1 | 10/2016 |
| WO | 2017139081 A1 | 8/2017 |
| WO | WO 2017/214162 A1 | 12/2017 |

OTHER PUBLICATIONS

ZTE Corporation, PCT International Search Report, PCT/CN2019/082282, dated Jun. 25, 2019, 4 pgs.

ZTE Corporation, JP First Office Action with English translation, JP 2021-512752, dated May 10,2022, 5pgs.

* cited by examiner

210 Quasi TEM

220 TM$_{00}$

230 HE$_{10}$

COUPLING DEVICE, SURFACE WAVE COUPLING METHOD AND OPEN WIRE SURFACE WAVE WIRELESS COVERAGE SYSTEM

CROSS-REFERENCES TO RELATED APPLICATIONS

The present application is a continuation of PCT Patent Application No. PCT/CN2019/082282, filed Apr. 11, 2019, which claims the benefit of priority to Chinese patent application No. 201811033366.3, filed Sep. 5, 2018, each of which is hereby incorporated by reference in its entirety.

TECHNICAL FIELD

Embodiments of the present disclosure relate to, but are not limited to, a coupling device, a surface wave coupling method, and an open wire surface wave wireless coverage system.

BACKGROUND

As people's demand for contents with higher quality, higher definition and faster response speed increases, the fifth-generation (5th-Generation, 5G) communication technology emerged, which includes a number of new technologies, such as Multiple Input Multiple Output (MIMO), Beam forming and millimeter wave communication. Among them, the millimeter wave communication technology mainly refers to a communication technology in which electromagnetic waves with wavelengths of millimeter-order (30 GHz~300 GHz) are used as carriers by which a base station accesses a network. This technology mainly uses a large number of bandwidth resources provided by high main frequency bands to increase data transfer rate.

In the related art, a scheme employing open wires for signal transmission is provided, where an overhead cable including power lines and the like may be referred to as an open wire. A scheme that employs surface waves (that is, open wire surface waves) transmitted on a surface of a power line to carry signals is referred to as an open wire surface wave wireless coverage scheme. The core of the open wire surface wave wireless coverage scheme is coupling of microwave signals and millimeter wave signals from a micro base station to open wire surface waves with weak constraint. But in the case where the cross-section of the open wire is large (for example, the diameter D>$\lambda$, where $\lambda$ is the design wavelength), surface wave modes of the open wire tend to be degenerated, the coupling between waveguide modes and these modes is extremely weak, and the processing difference in performance parameters of the dielectric material is close to a coupling coefficient, thus it is difficult to effectively couple these modes by direct coupling of waveguide or by performing an end-face coupling through geometric optics. The failure of effectively coupling the specified weakly constrained surface wave mode on the open wire will result in: 1) a reduction in the effective transmission energy (when coupling a bare metal wire), 2) a reduction in the effective transmission energy and crosstalk caused by the various modes (when coupling a Goubau line). Diameters of cross-sections of most overhead open wires is greater than the wavelength of millimeter wave. Therefore, for microwave, especially electromagnetic waves in millimeter wave frequency band, it needs to provide a solution to improve effective transmission energy and reduce crosstalk.

SUMMARY

At least one embodiment of the present disclosure provides a coupling device, a surface wave coupling method, and an open wire surface wave wireless coverage system, so as to improve effective transmission energy and reduce crosstalk.

An embodiment of the present disclosure provides a coupling device, including: a high-order mode direct coupling module configured to couple a first electromagnetic wave from a transmitter to form a second electromagnetic wave propagating in a preset high-order guided wave mode; a mode converting and filtering module configured to convert the second electromagnetic wave into a third electromagnetic wave propagating in a superposition of a plurality of guided wave modes including a preset low-order guided wave mode and at least one high-order guided wave mode, and to filter out the high-order guided wave mode in the third electromagnetic wave to obtain a fourth electromagnetic wave propagating in the preset low-order guided wave mode; and a mode matching module configured to convert the fourth electromagnetic wave into a fifth electromagnetic wave propagating along a surface of an open wire in a target guided wave mode.

An embodiment of the present disclosure provides a coupling device, including: a mode matching module configured to convert a sixth electromagnetic wave propagating in a target guided wave mode into a seventh electromagnetic wave propagating in a preset low-order guided wave mode; a mode converting and filtering module configured to convert the seventh electromagnetic wave into an eighth electromagnetic wave propagating in a superposition of a plurality of guided wave modes including a preset high-order guided wave mode, and filter the high-order guided wave mode reflected to a direction of the mode matching module; and a high-order mode direct coupling module configured to couple a component propagating in the preset high-order guided wave mode in the eighth electromagnetic wave to a waveguide connected to a receiver.

An embodiment of the present disclosure provides a surface wave coupling method, including: coupling a first electromagnetic wave from a transmitter to form a second electromagnetic wave propagating in a preset high-order guided wave mode; converting the second electromagnetic wave into a third electromagnetic wave propagating in a superposition of a plurality of guided wave modes including a preset low-order guided wave mode and at least one high-order guided wave mode, and filtering out the high-order guided wave mode in the third electromagnetic wave to obtain a fourth electromagnetic wave propagating in the preset low-order guided wave mode; and converting the fourth electromagnetic wave into a fifth electromagnetic wave propagating along a surface of an open wire in a target guided wave mode.

An embodiment of the present disclosure provides a surface wave coupling method, including: converting a sixth electromagnetic wave propagating on a surface of an open wire in a target guided wave mode into a seventh electromagnetic wave propagating in a preset low-order guided wave mode; converting the seventh electromagnetic wave into an eighth electromagnetic wave propagating in a superposition of a plurality of guided wave modes including a preset high-order guided wave mode, and filtering the high-order guided wave mode reflected to the mode matching module; and coupling a component propagating in the preset high-order guided wave mode in the eighth electromagnetic wave to a waveguide connected to a receiver.

An embodiment of the present disclosure provides an open wire surface wave wireless coverage system, including at least one micro base station and a plurality of coupling devices as described above, the micro base station being connected to at least one of the coupling devices through a waveguide, wherein, the micro base station is configured to send an electromagnetic wave carrying information to a coupling device connected to the micro base station through a waveguide, and obtain an electromagnetic wave carrying information from the coupling device connected to the micro base station; and the coupling device is configured to couple the electromagnetic wave carrying information sent by the micro base station connected to the coupling device, to the open wire to propagate along the surface of the open wire in a target guided wave mode, and couple the electromagnetic wave carrying information propagating along the surface of the open wire to the micro base station connected to the coupling device.

Compared with the related art, according to at least one embodiment of the present disclosure, a mode with high purity is obtained by coupling an electromagnetic wave to a preset high-order mode and then converting it into a superposition of a preset low-order mode and a plurality of high-order modes, and then obtaining the electromagnetic wave in the preset low-level mode through filtering, and thus large effective transmission energy and small crosstalk is obtained. In addition, when coupling the electromagnetic wave to the preset high-order mode, the coupling effect will be less impacted by the processing error of the waveguide, as compared with the direct coupling or end-face coupling in the related art.

Other features and advantages of the present disclosure will be described in the following description, and partly of them will be obvious from the description, or be understood by implementing the present disclosure. The purpose and other advantages of the present disclosure can be realized and obtained through the structures specifically pointed out in the description, claims and drawings.

BRIEF DESCRIPTION OF THE DRAWINGS

The accompanying drawings provide a further understanding of the present disclosure and constitute a part of the specification. The accompanying drawings, together with the embodiments of the present application, are used to explain the present disclosure, which do not constitute a limitation to the present disclosure.

DETAILED DESCRIPTION

Figure 1A:
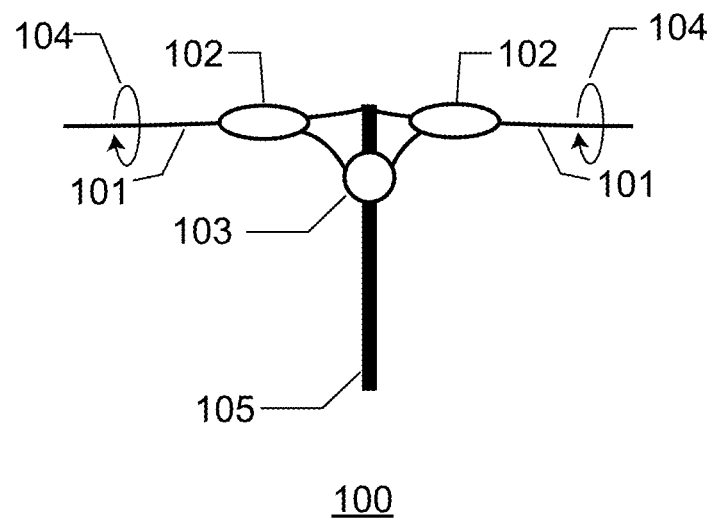
FIG. 1A to FIG. 1B are schematic diagrams illustrating a backhaul method and an transmission environment in the open wire surface wave wireless coverage system.

In order to make the objectives, embodiments and advantages of the present disclosure clearer, the embodiments of the present disclosure will be described in detail below in conjunction with the accompanying drawings. It should be noted that the embodiments in the present disclosure and the features in the embodiments may be combined with each other arbitrarily if there is no conflict.

It should be noted that the term "parallel" is generally a geometric structure that cannot be accurately achieved in a real system. Therefore, when being used to describe the embodiments disclosed in this application, the term "parallel" in this application refers to an approximate configuration rather than an exact configuration, that is, "parallel" mentioned in this application includes both exactly parallel and approximately parallel.

One or more embodiments will now be described with reference to the drawings, in which the same reference numerals are used to indicate the same elements. In the following description, many specific details are explained in order to provide a thorough understanding of various embodiments.

In the field of base station backhaul communication, an existing power supply system is employed and micro base stations are deployed on telegraph poles, the base stations on adjacent telegraph poles perform backhaul through power lines therebetween or other cables such as telephone lines. The carrier of the return signal is a surface wave in the millimeter wave frequency band transmitted on the surface of the power line (or other cable). The surface wave has the characteristics of low loss, low dispersion and large bandwidth, so it is an economical and effective deployment scheme for millimeter wave micro base station. In fact, in addition to the power line, for a cable having an insulator or air as its outer layer, the surface of the cable has surface waves with low loss and low dispersion in some frequency bands. This kind of "open" cable may be called an open wire, and the surface waves on this kind of cable may be referred to as surface waves of open wire. In this application, the scheme employing surface wave of open wire for backhaul may be referred to as an open wire surface wave wireless coverage scheme. The coverage scheme has advantages of large bandwidth, wide coverage and easy deployment, and thus it is a competitive millimeter wave deployment scheme.

Weakly constrained surface wave modes for open wire (such as Sommerfeld wave for bare metal wire, or low-order modes for a Goubau line with insulating layer, such as TM01, EH11, TE01, and HE11 having frequencies close to a cut-off frequency) have characteristics of low loss, which are particularly suitable for establishing connections between micro base stations. This is a basis for implementing the open wire surface wave wireless coverage scheme.

The main implementation methods in the related art are waveguide coupling and end-face coupling using a principle of geometric optics. Waveguide coupling refers to coupling an electromagnetic wave from a mode in one waveguide to a mode in another waveguide by means of mode coupling in two waveguides close to each other. End-face coupling refers to directly irradiating an electromagnetic wave to an end face of the waveguide, thereby coupling the electromagnetic wave to a specified mode matched thereto on the end face.

Referring now to FIG. 1, FIG. 1 depicts non-limiting embodiments of a backhaul method 100 and transmission environments 110 and 120 for microwave and millimeter wave signals in an open wire surface wave wireless coverage scheme.

First, referring to FIG. 1A, 100 shows a non-limiting embodiment of the backhaul method for microwave and millimeter wave signals in the open wire surface wave wireless coverage scheme. The microwave and millimeter wave signals carrying modulation information propagate on an open wire 101 in a specified weakly constrained surface wave mode 104, and are coupled to a micro base station 103 through a coupling device 102. The micro base station 103 is installed on a supporting pole 105 (such as a telegraph pole) of the open wire 101, and it is configured to process the microwave and millimeter wave signals from the coupling device 102. The processing includes amplification, filtering, demodulation, interference correction, etc. Then the micro base station 103 couples the processed microwave and millimeter wave signals to the next section of open wire 101 by using the coupling device 102. Through a similar process, the microwave and millimeter wave signals may be transmitted along the open wire and the supporting poles may be used as nodes for wireless coverage.

Figure 1B:
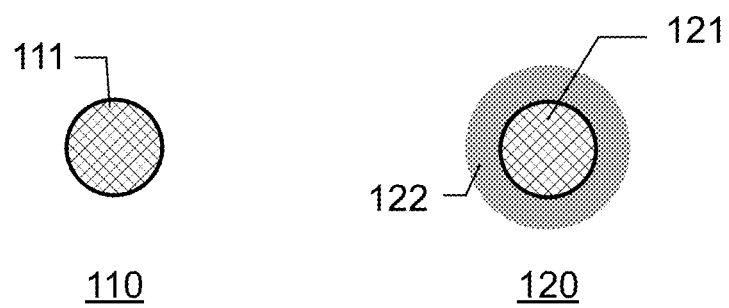

Next, referring to FIG. 1B, 110 and 120 illustrates the microwave and millimeter wave transmission environments, i.e. two common non-limiting embodiments for the open wires. 110 indicates a cross section of an open wire, which refers to a case in which the wire is a bare metal wire. This kind of cable includes a bare metal wire 111 and air outside the metal. 120 indicates a cross-sectional structure of a cable, which refers to a case in which an outer layer of the wire is an insulating layer, that is, a Goubau line. There is a layer of insulating material 122 between a bare metal wire 121 and air to prevent leakage and reduce radiation energy loss. The above two cables 110 and 120 may be applied to different scenarios, and for the two cables, the most suitable transmission modes are different. Therefore, it needs to select the suitable transmission mode according to the specific forms of cables in different application scenarios.

Now referring to FIG. 2, FIG. 2 illustrates modes for the bare metal wire and the Goubau line.

Figure 2A:
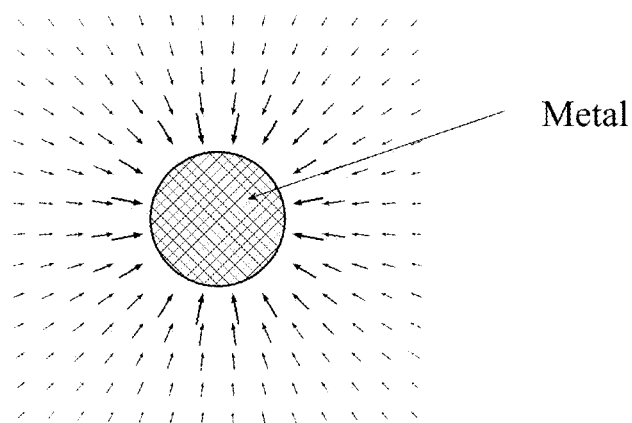
FIG. 2A to FIG. 2C are schematic diagrams illustrating several common surface wave modes for the open wire.

In FIG. 2A, 210 indicates intensity and direction distribution of a transverse electric field on the cross section of the wire in a low-loss constrained surface wave mode, when the open wire is a bare metal wire. The length of arrow represents the intensity. This mode has an azimuthally symmetry, the direction of the electric field on the cross section is a direction along a radial direction and perpendicular to a metal surface, and the intensity attenuates in the form of 1/r in an area close to the metal wire along the radial direction and attenuates exponentially in an area away from the metal wire along the radial direction. This model was first proposed by Arnold Sommerfeld, so it is called Sommerfeld wave. Due to the attenuation in the form of 1/r along the radial direction near the metal wire, which is similar to the TEM mode, the Sommerfeld wave may also be called a quasi-TEM mode. An equivalent refractive index of the Sommerfeld wave is greater than but very close to 1, that is, a propagating wave vector is greater than a vacuum wave vector k0 but very close to the vacuum wave vector k0. The Sommerfeld wave attenuates slowly on the cross section, so the mode field is very large, resulting in a very small transmission loss. As an example, when the metal wire is made of copper and the radius is 1 cm, the ohmic loss of Sommerfeld wave between 10 GHz and 100 GHz does not exceed −30 dB/km, and thus the loss may be ignored as the distance between poles is usually 25 m.

The equivalent refractive indexes of other modes (such as the HE10 mode) for the bare metal wire are less than 1, and thus they belong to a radiation mode. It means that these modes will generate radiation and thus result in loss during transmission along a bare wire. This situation is similar to electromagnetic waves propagating in the free space, and the transmission and reception processes of these radiation modes are similar to the process of transmission and reception through an antenna, thus the loss depends on the space path loss and antenna gain.

Now the case that the power line is Goubau line 120 is considered. This kind of metal cable with an insulating layer was first used by George J. E. Goubau to improve the transmission of microwave signals on the metal wire, so it is called a Goubau line.

Figure 2B:
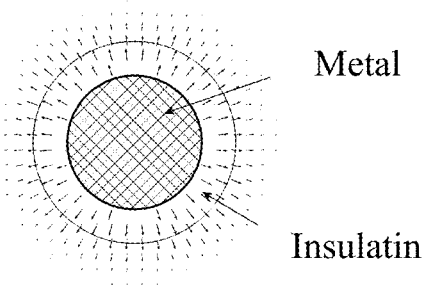

FIG. 2B illustrates the electric field intensity and direction distribution of the TM00 mode 220, where the length of arrow represents the intensity. The distribution of the TM00 mode 220 is similar to that of the Sommerfeld wave 210 in the bare wire, that is, the TM00 mode 220 has an azimuthally symmetry, and the direction of the electric field is along the radial direction and perpendicular to the metal surface.

Figure 2C:
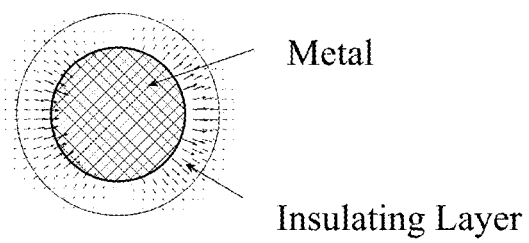

FIG. 2C shows the electric field intensity and direction distribution of the HE10 mode 230, where the length of arrow represents the intensity. The HE10 mode 230 is different from the TM00 mode 220 in that the field distribution has one period of oscillation along an azimuthal direction. Except that, the distribution of the HE10 mode 230 are basically the same as that of the TM00 mode 220, and the electric field is basically distributed along the radial direction and perpendicular to the metal surface.

In addition to the above two modes, there are other modes for the Gaobao line, which will not be repeated here.

The outer insulating layer of the Goubau line generally has loss, and the dielectric loss of the insulating material is large for the microwave and millimeter wave frequency bands. As a non-limiting embodiment, the open wire is a power line, a pole pitch is 25 m, and a dielectric constant and tangent of a loss angle of the insulating layer material (polyethylene) commonly used for power lines are 2 and 0.001 respectively. At 30 GHz, the dielectric loss of the material itself is 3.86 dB/m. A loss for 25 m will be close to −100 dB. When the insulating layer is thick and the wavelength is short, the mode loss in the Goubau line will be close to this value. However, when the carrier frequency is close to a cut-off frequency of ae specific mode for the Goubau line, the mode field will gradually be separated from the dielectric layer and thus will be distributed in the air (which has a mode diffusion characteristic similar to that of the Sommerfeld wave 210). At this time, the dielectric loss affects less on the transmission of the nearly cut-off mode. This kind of surface wave is called a weakly constrained surface wave. The weakly constrained surface wave with a frequency close to the cut-off frequency has a very small loss and may be used for signal return on the open wire. For example, when the metal radius is 1 cm and the thickness of the polyethylene insulating layer is 5 mm, the TE01 mode at the frequency of 17-20 GHz or the TM01 mode at the frequency of 31-33 GHz has characteristics of weak constraint and low loss.

The mode in the open wire with a plurality of insulating layers is similar to the mode in the Goubau line with a single insulating layer, which has a weakly constrained surface wave at frequencies close to the cut-off frequency. The transmission frequency and field distribution of these weakly constrained surface wave modes are uncertain. For different cables, there are different types of weakly constrained surface waves. Therefore, the coupling device that couples the microwave and millimeter wave signals from the micro base station to the power line needs to excite the specific weakly constrained surface wave in the specific open wire, that is, the coupling device needs to have wide applicability for the coupling modes.

In general, the weakly constrained surface waves used for the backhaul between micro base stations are in low-order modes, such as Sommerfeld wave 210 in the bare metal wire and TM00 mode 220 or HE10 mode 230 in the Goubau line. When trying to couple these low-order weakly constrained surface wave modes, an unavoidable problem is the mode degeneracy effect between these modes, especially when the size of the power line is large (such as its radius DA). The mode degeneracy in the open wire refers to that eigenvalues of a plurality of eigenelectromagnetic modes are very close to the corresponding transmission constants. When the traditional direct coupling method is used for excitation, these eigenmodes will be excited at the same time to form a hybrid mode, however, the eigenmode specified therein cannot be excited separately. The two traditional surface wave coupling methods shown in FIGS. 3A and 3B will illustrate this effect.

Figure 3A:
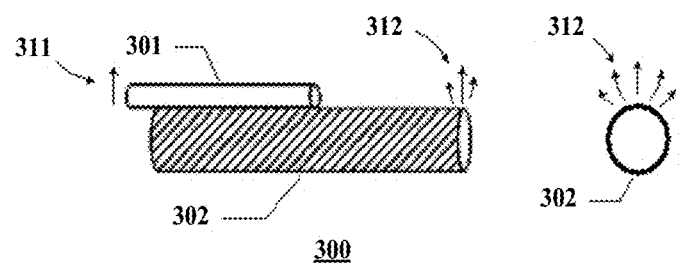
FIG. 3A to FIG. 3B illustrate two traditional surface wave coupling devices.

The coupler 300 shown in FIG. 3A adopts a waveguide direct coupling method. Waveguide direct coupling refers to coupling the electromagnetic wave from a mode in one waveguide to a mode in another waveguide by the mode coupling in two waveguides close to each other. In FIG. 3A, the microwave or millimeter wave signals 311 from the main base station or the micro base station are directly coupled with a plurality of modes in the open wire 302 through the dielectric waveguide 301, and a hybrid mode 312 is obtained by excitation. It can be seen that the hybrid mode 312 has an asymmetric distribution characteristic. In fact, the hybrid mode 312 is not an eigenmode of this kind of open wire, but it includes a plurality of eigen surface wave modes. Because the eigenvalues of these low-order eigenmodes are close to each other, degeneracy may exist. Since in a specific frequency band, the specified mode has a low-loss transmission characteristic, the hybrid mode 312 will inevitably lead to a waste of transmission energy.

Figure 3B:
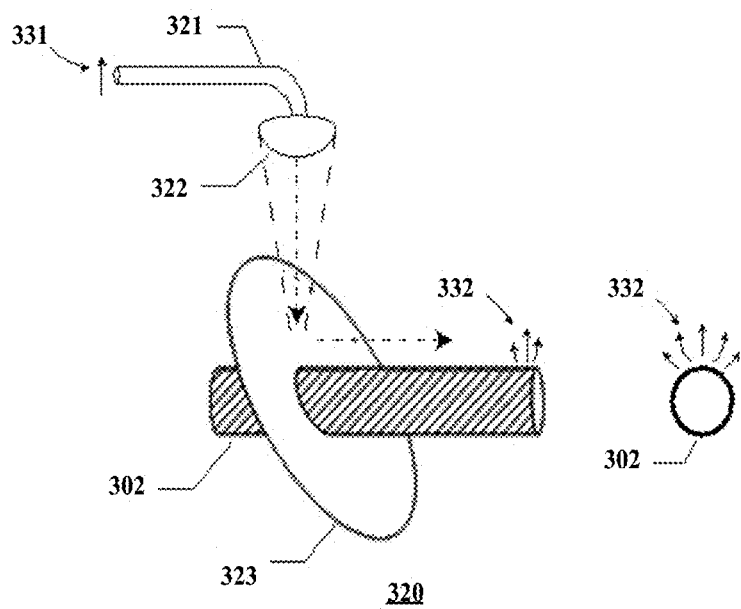

The coupler 320 shown in FIG. 3B adopts end-face coupling through geometrical optics. End-face coupling refers to directly irradiating electromagnetic wave on an end face of the waveguide, thereby coupling the electromagnetic wave to a specified mode matched thereto on the end face. In FIG. 3B, the microwave or millimeter wave signal 311 from the main base station or the micro base station is focused though the dielectric waveguide 321 and the dielectric lens 322 to the vicinity of the center of the reflector 323 placed at an angle of 45° relative to the open wire, and through reflection by the reflector 323, the microwave and millimeter wave signals are end-face-coupled with a plurality of surface wave modes in the open wire 302 to form a hybrid mode 332. Similarly, the hybrid mode 332 includes a plurality of surface wave eigenmodes, as the degeneracy of these low-order eigenmodes exists. Since in a specific frequency band, the specified mode has a low-loss transmission characteristic, the hybrid mode 332 will inevitably lead to a waste of transmission energy.

As the hybrid mode 331 and the hybrid mode 332 include a plurality of surface wave eigenmodes, when the electromagnetic waves propagate in these hybrid modes in the open wire, crosstalk may arise in some cases. The reason for the crosstalk is that the eigenvalues and propagation constants for various surface wave eigenmodes in the hybrid mode 312 and the hybrid mode 332 are very close but not completely equal. Therefore, after transmission of thousands of wavelengths, the phase differences of these eigenmodes will change, thereby affecting the distribution of the asymmetric hybrid mode 312 and the hybrid mode 332. This crosstalk will affect the signal quality at the receiving end.

Figure 3C:
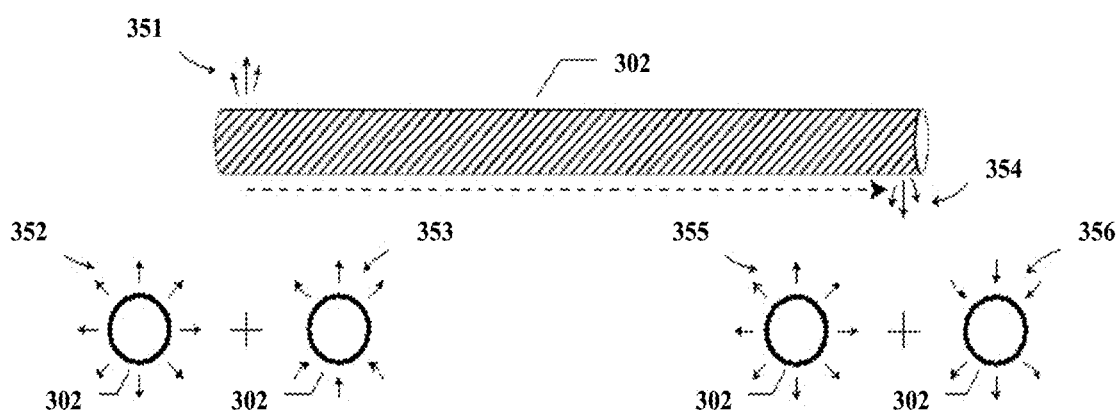
FIG. 3C is a schematic diagram illustrating crosstalk.

FIG. 3C illustrates a non-limiting embodiment of the crosstalk phenomenon. The open wire 302 is a Goubau line, and the hybrid mode 351 is located mainly above the start end of the open wire 302, and can be expressed as an in-phase superposition of two eigenmodes 352 and 353. Due to the slight difference between the propagation constants of eigenmodes 352 and 353, after the transmission of thousands of wavelengths, the two eigenmodes 352 and 353 at the start end are transformed into eigenmodes 355 and 356 at the terminal end, respectively. At this time, the eigenmodes 355 and 356 are opposite in phase, and superimposed into a hybrid mode 354, which is mainly located below the open wire. This phenomenon is called crosstalk. Assuming that the surface wave direct coupling device 300 is located above the open wire at both the start end and terminal end of the open wire, it is conceivable that it is difficult to couple the hybrid mode 354 at the terminal end into the direct coupling device at the terminal end.

Of course, the hybrid mode 354 located below the open wire can be transferred to be located above the open wire through a similar process after a certain transmission distance. However, it should be noted that the transmission constants of the respective eigenmodes are unknown, and thus the distribution of the hybrid modes 351 and 354 along the open wire 302 is difficult to be predicted. Therefore, once there is crosstalk in the open wire 302, it is difficult to eliminate the effect caused thereby.

In addition to the disadvantages shown in FIG. 3C, the direct coupling and end-face coupling of low-order weakly constrained surface wave modes also have weak coupling effects, resulting ineffective coupling in engineering. Taking a Goubau line as an example, when the material of the metal wire is copper, the radius is 1 cm, the insulating layer is polyethylene, and the thickness is 5 mm, at a frequency of 20 GHz, the difference between propagation constants of the TE01 mode and the HE11 mode is about 1%. If foam material with a refractive index close to the equivalent refractive index of the two modes is directly used to forms a dielectric waveguide for coupling, the error of the refractive index of the foam needs to be less than 1% when it is processed in large quantities. If the error of the refractive index of the foam is greater than or equal to 1%, the foam waveguide (which was originally designed to obtain the TE01 mode by coupling) obtains the HE11 mode by coupling, and thus affecting the transmission characteristics.

Figure 4A:
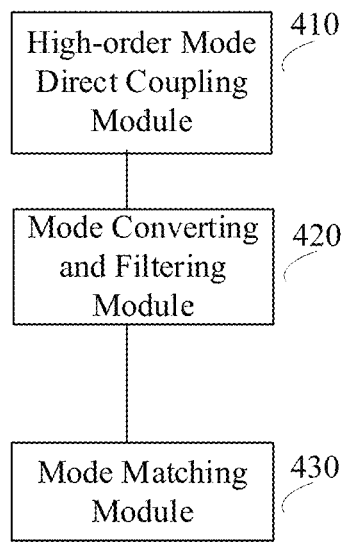
FIG. 4A is a schematic diagram illustrating a coupling device according to an embodiment of the present disclosure (at transmitting end)

As shown in FIG. 4A, an embodiment of the present disclosure provides a coupling device, including:

a high-order mode direct coupling module 410 configured to couple a first electromagnetic wave from a transmitter to form a second electromagnetic wave propagating in a preset high-order guided wave mode;

a mode converting and filtering module 420 configured to convert the second electromagnetic wave into a third electromagnetic wave propagating in a superposition of a plurality of guided wave modes including a preset low-order guided wave mode and at least one high-order guided wave mode, and filter out the high-order guided wave mode in the third electromagnetic wave to obtain a fourth electromagnetic wave propagating in the preset low-order guided wave mode;

a mode matching module 430 configured to convert the fourth electromagnetic wave into a fifth electromagnetic wave propagating along a surface of an open wire in a target guided wave mode.

In the coupling device according to the embodiments of the present disclosure, a mode with high purity is obtained by coupling an electromagnetic wave to a preset high-order mode and then converting it into a superposition of a preset low-order mode and a plurality of high-order modes, and then obtaining the electromagnetic wave in the preset low-level mode through filtering, and thus large effective transmission energy and small crosstalk are obtained. In addition, the electromagnetic wave is coupled by the high-order mode direct coupling module 410 to a preset high-order waveguide mode, and the mode independence of the preset high-order waveguide mode is strong (the propagation constant or eigenvalue of the preset high-order waveguide mode are significantly different from that of the modes nearby). In order to implement the waveguide coupling, the propagation constants of respective modes of the waveguides participating in the coupling have to be in consistent to achieve resonance conditions. Compared with direct coupling to the target guided wave mode in a degenerate state, when the preset high-order waveguide mode is coupled to, the transmission constant deviation caused by the processing error (including material error and dimensional error) of the waveguide participating in the coupling will not easily exceed the deviation between the propagation constants of the preset high-order mode and the modes nearby, and thus the mode purity of the preset high-order mode can be ensured. Therefore, as compared with the coupling method in the related art, the coupling effect of coupling the electromagnetic wave to the preset high-order mode will be less affected by the processing error of the waveguide.

The target guided wave mode is a weakly constrained surface wave mode, including but not limited to Sommerfeld wave, TM01 mode, EH11 mode, TE01 mode and HE11 mode, etc., and the target guided wave mode can be set as needed.

The preset high-order guided wave mode may be set as needed, such as an azimuthal high-order mode. For a metal coaxial waveguide (the surface of which is covered with a metal layer), the preset high-order guided wave mode may refer to a mode in TEmn and TMmn in which the value of an azimuthal wavenumber index m is larger. For a coaxial waveguide covered with an insulating layer on the surface, the preset high-order guided wave mode refers to a mode in HEmn and EHmn in which the value of an azimuthal wavenumber index m is larger.

The preset low-order guided wave mode may be set according to the target guided wave mode, such as an azimuthal low-order mode. For a metal coaxial waveguide, the preset low-order guided wave mode may refer to a mode in TEmn and TMmn in which the value of an azimuthal wavenumber index m is smaller, including TEM mode. For a metal waveguide covered with an insulating layer on the surface, the preset low-order guided wave mode may refer to a mode in in HEmn and EHmn in which the value of an azimuthal wavenumber index m is smaller, including TM0n mode and TE0n mode.

In one example, the preset high-order guided wave mode is, for example, an azimuthal high-order conduction mode, and the plurality of guided wave modes are, for example, a superposition of an azimuthal low-order conduction mode and an azimuthal high-order cut-off mode. The mode converting and filtering module 420 performs attenuation and reflection on the azimuthal high-order cut-off mode, and obtains the azimuthal low-order conduction mode by filtering. The conduction mode refers to a non-cut-off mode with transmission characteristics in the propagation direction of waveguide, and the cut-off mode refers to a mode that attenuates exponentially in the propagation direction of waveguide.

In an embodiment, the high-order mode direct coupling module 410 includes a pillar waveguide and a first coaxial waveguide that are disposed close to each other, wherein the pillar waveguide is parallel to the first coaxial waveguide, two end faces of the pillar waveguide are respectively aligned with two end faces of the first coaxial waveguide, and the first coaxial waveguide wraps the open wire. The transmitter is connected to the pillar waveguide through a waveguide (such as a dielectric waveguide), and the electromagnetic wave emitted by the transmitter is transmitted to the pillar waveguide through the waveguide (the electromagnetic wave fundamental mode is usually taken as the propagation mode, such as TE11 mode). The electromagnetic wave is coupled to the first coaxial waveguide through direct coupling to propagate in the preset high-order guided wave mode. Since the guided wave mode in the waveguide depends on the shape and material of the waveguide, the size and material of the first coaxial waveguide may be determined according to the preset high-order guided wave mode.

In an embodiment, the mode converting and filtering module includes a ring grid and a second coaxial waveguide electromagnetic performance parameters of the ring grid are periodically distributed in an azimuthal direction, and the ring grid is located between the first coaxial waveguide and the second coaxial waveguide; a size of end faces of the ring grid is the same as that of end faces of the first coaxial waveguide, a size of end faces of the second coaxial waveguide is the same as that of end faces of the first coaxial waveguide; an axis of the ring grid is in consistent with axes of the first coaxial waveguide and the second coaxial waveguide; the ring grid and the second coaxial waveguide wrap the open wire; and an end surface of the ring grid is close to an end surface of the second coaxial waveguide; an end surface of the ring grid is close to an end surface of the first coaxial waveguide. It should be noted that the end face of the ring grid may also be larger than that of the first coaxial waveguide. The size and material of the second coaxial waveguide may be determined according to the high-order guided wave modes that have to be filtered out. The ring grid is, for example, a metal grid composed of a fan-shaped copper foil that is periodically distributed in the azimuthal direction, and the second coaxial waveguide is filled with materials (air, foam, etc.) having the following relative dielectric constant: the relative dielectric constant is smaller than that of the dielectric materials filled in the first coaxial waveguide and is as close as possible to the relative dielectric constant 1 of the vacuum, such that the high-order modes other than the preset low-order guided wave modes are cut off as much as possible to achieve the mode filtering effect.

In an embodiment, the number of cycles of the ring grid is determined according to the preset high-order guided wave mode and the target guided wave mode. For example, the number of cycles of the ring grid may be determined by subtracting the number of azimuthal indexes of the target guided wave mode from the number of azimuthal indexes of the preset high-order guided wave mode.

In an embodiment, the electromagnetic performance parameter includes at least one of the following: transmittance and phase difference. For example, the transparency of the ring grid changes in four cycles, and the phases of two adjacent areas on the ring grid are opposite.

In an embodiment, a surface of the pillar waveguide is an insulating layer or a metal layer, that is, a dielectric waveguide composed of a dielectric, or a cavity waveguide with dielectric inside and a surface covered with a metal layer. A surface of the first coaxial waveguide is an insulating layer or a metal layer, that is, an inner surface of the first coaxial waveguide is a metal layer, the middle of the first coaxial waveguide is a dielectric layer, and an outer surface of the first coaxial waveguide is a metal layer; or the first coaxial waveguide only has a metal layer on the inner surface and the dielectric layer. The surface of the second coaxial waveguide is a metal layer, that is, an inner surface of the second coaxial waveguide is a metal layer, the middle of the second coaxial waveguide is a dielectric layer, and an outer surface of the second coaxial waveguide is a metal layer. It should be noted that when the surface of the pillar waveguide is a metal layer and the surface of the first coaxial waveguide is a metal layer, the pillar waveguide and the first coaxial waveguide have grooves in areas close to each other.

In the above embodiments, the metal layers of the pillar waveguide, the first coaxial waveguide, the ring grid and the second coaxial waveguide may be copper foil, aluminum foil, gold foil, silver foil, etc., and the dielectric layer may be made of polyethylene (PE), Polytetrafluoroethylene (PTFE), Teflon (Teflon), perfluoroethylene propylene copolymer (FEP), ethylene-tetrafluoroethylene copolymer (ETFE), ceramics and other dielectric materials commonly used in the microwave and millimeter wave frequency bands. The dielectric constant of the dielectric layer material in the second coaxial waveguide is smaller than that of the first coaxial waveguide and is as close to 1 as possible, and the material may also be foam and air.

In an embodiment, the mode matching module converting the fourth electromagnetic wave into the fifth electromagnetic wave propagating along the surface of the open wire in the target guided wave mode includes: the mode matching module converting the fourth electromagnetic wave into the fifth electromagnetic wave propagating in a direction parallel to the open wire. That is, the fourth electromagnetic wave is converted into a beam parallel to the open wire, and the mode matching module only changes the propagation direction of the fourth electromagnetic wave. Therefore, there is a certain correlation between the preset low-order guided wave mode and the target guided wave mode. For example, when the target guided wave mode is Sommerfeld wave or TM00 mode, the preset low-order guided wave mode is TEM mode. For another example, when the target guided wave mode is HE10 mode, the preset low-order guided wave mode is TE10 mode. For still another example, when the guided wave mode is the HE20 mode, the preset low-order guided wave mode is the TE20 mode, and so on.

In an embodiment, the mode matching module includes an azimuthally symmetrical lens, the lens includes a cylindrical hole for accommodating the open wire, the axes of the lens and the cylindrical hole are in consistent with the that of the second coaxial waveguide, the lens is close to the second coaxial waveguide and away from the ring grid, an end face of the second coaxial waveguide away from the ring grid is located on a focal plane of the lens, and a size of an end face of the lens close to the second coaxial waveguide is the same as that of the end face of the second coaxial waveguide. It should be noted that the end face of the lens may also be larger than the end face of the second coaxial waveguide, and its orthographic projection on the end face of the second coaxial waveguide completely covers the end face of the second coaxial waveguide.

In an embodiment, the lens is a Fresnel lens, or a Fresnel zone plate, or a lens having a convex end face at an end away from the end face of the second coaxial waveguide. The lens and Fresnel lens can employ dielectric materials commonly used in the microwave and millimeter wave frequency bands, such as polyethylene (PE), Polytetrafluoroethylene (PTFE), Teflon (Teflon), perfluoroethylene propylene copolymer (FEP), ethylene-tetrafluoroethylene copolymer (ETFE), ceramics, foam, etc. The Fresnel zone plate may be composed of metal layers including copper foil, aluminum foil, gold foil and silver foil. It should be noted that the inner diameters of the first coaxial waveguide, the second coaxial waveguide, the ring grid and the lens are the same as or slightly larger than the outer diameter of the open wire they wrap.

In an embodiment, the first electromagnetic wave is a microwave or millimeter wave signal.

In addition, the coupling device may include a fixing module configured to fix the positions of respective modules of the coupling device. The fixing module is, for example, a foam layer covering the outer surfaces of the above modules.

Figure 4B:
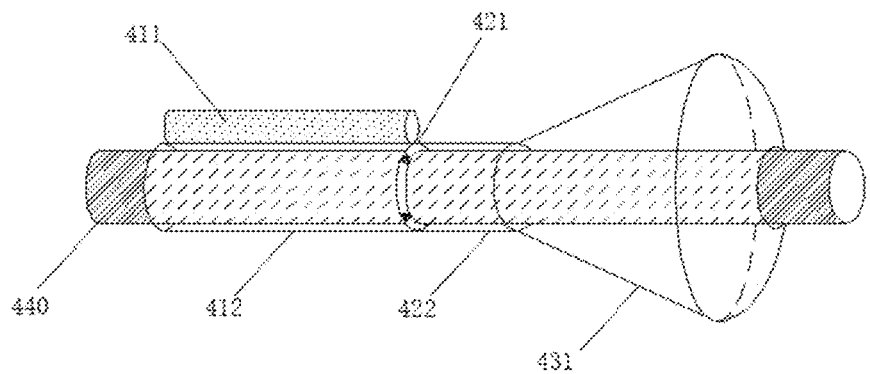
FIG. 4B is a schematic diagram illustrating a coupling device according to an embodiment of the present disclosure.

FIG. 4B is a schematic diagram illustrating the coupling device provided by the present disclosure. As shown in FIG. 4B, the coupling device, includes: a high-order mode direct coupling module 410; a mode converting and filtering module 420; and a radial spatial modulation structure 431.

The high-order mode direct coupling module 410 includes a pillar waveguide 411 and a first coaxial waveguide 412. The pillar waveguide 411 is filled with a dielectric having a certain dielectric constant, and the first coaxial waveguide 412 wraps the open wire and is filled with a dielectric with a certain dielectric constant. The pillar waveguide 411 and the first coaxial waveguide 412 are parallel to each other and have the same length, and two end faces of the pillar waveguide 411 are respectively aligned with two end faces of the first coaxial waveguide 412. The material and size of the first coaxial waveguide are determined according to the preset high-order guided wave mode. The high-order mode direct coupling module 410 is configured to couple the fundamental mode of the electromagnetic wave in the pillar waveguide to the azimuthal high-order guided wave mode (i.e., the preset high-order guided wave mode) for the coaxial waveguide or the Goubau line. In another embodiment, the length of the pillar waveguide 411 may be different from that of the first coaxial waveguide 412. It should be noted that the cross section of the pillar waveguide 411 shown in FIG. 4B is circular. In other embodiments, the cross section of the pillar waveguide 411 may also have other shapes (such as square, etc.).

The mode converting and filtering module 420 includes an azimuthally periodically distributed ring grid 421 and a mode low-pass filter waveguide 422 (i.e., the second coaxial waveguide). The electromagnetic performance parameters (such as transmittance and phase difference) of the azimuthally periodically distributed ring grid 421 are periodically distributed in the azimuthal direction, and the number of cycles (or topological charge) of the ring grid 421 is determined according to the target guided wave mode. The ring grid 421 azimuthally and periodically modulates the amplitude and phase of the azimuthal high-order guided wave mode excited by the high-order mode direct coupling module 410 through the periodic distribution in the azimuthal direction of electromagnetic performance parameters, so as to convert it into a superposition of the azimuthal low-order guided wave mode and the azimuthal high-order cut-off mode, and then the mode low-pass waveguide 422 attenuates and reflects the azimuthal high-order cut-off mode to obtain the azimuthal low-order guided wave mode by filtering.

The radial spatial modulation structure 431 is taken as the mode matching module 430. The radial spatial modulation structure 431 is made of, for example, a material with dielectric constant being symmetrical in the azimuthal direction and varying in the radial direction, or a "hemispherical" structure with size being symmetrical in the azimuthal direction and varying in the radial direction, or a grating structure that is symmetrical in the azimuthal direction and is periodically arranged in the radial direction. The radial spatial modulation structure 431 converts the azimuthal low-order guided wave mode obtained by filtering of the mode converting and filtering module 420 into a target guided wave mode).

It should be noted that FIG. 4B is only an example of the coupling device. For example, in one embodiment, the first coaxial waveguide 412, the ring grid 421 and the mode low-pass filter waveguide 422 may not wrap the open wire, but are placed outside the open wire. The mode matching module 430 may not be the lens shown in FIG. 4B, but may have the structure shown in FIG. 3B. After the electromagnetic wave from the mode low-pass filter waveguide 422 is focused, it is emitted to the open wire surface 440 through a reflector.

In addition, in this embodiment, the adjacent end faces of the first coaxial waveguide 412, the ring grid 421 and the mode low-pass filter waveguide 422 may all have the same shape and size. In another embodiment, the end faces may also be inconsistent in shape and size.

The mode converting and filtering module can effectively filter out high-order modes other than the preset low-order guided wave modes, and the final obtained guided wave mode is pure, thus the coupling device can be considered as achieving efficient excitation of the target guided wave mode.

Figure 4C:
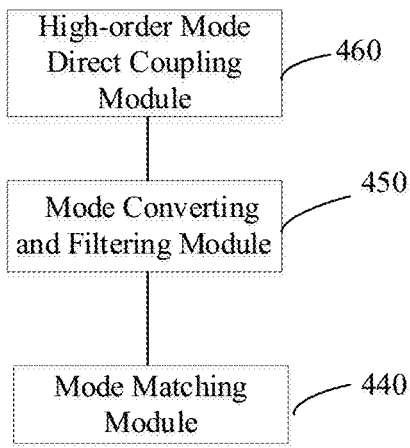
FIG. 4C is a schematic diagram illustrating a coupling device according to an embodiment of the present disclosure (at receiving end)

According to the reciprocity of a passive device, the aforementioned coupling device can also be used to receive electromagnetic wave and couple the electromagnetic wave on the open wire to a receiver. As shown in FIG. 4C, an embodiment of the present disclosure provides a coupling device, including:

a mode matching module 440 configured to convert a sixth electromagnetic wave propagating in a target guided wave mode into a seventh electromagnetic wave propagating in a preset low-order guided wave mode;

a mode converting and filtering module 450 configured to convert the seventh electromagnetic wave into an eighth electromagnetic wave propagating in a superposition of a plurality of guided wave modes including a preset high-order guided wave mode, and filter the high-order guided wave mode reflected to the mode matching module;

a high-order mode direct coupling module 460 configured to couple a component propagating in the preset high-order guided wave mode in the eighth electromagnetic wave to a waveguide connected to a receiver. The electromagnetic wave is transmitted to the receiver by the waveguide. The above-mentioned transmitter and receiver may be set in the same device capable of transmitting and receiving, such as a micro base station.

The structures of the mode matching module 440, the mode converting and filtering module 450 and the higher-order mode direct coupling module 460 may refer to those of the mode matching module 430, the mode converting and filtering module 420 and the higher-order mode direct coupling module 410 in the above embodiments respectively, which will not be repeated herein.

It should be noted that the coupling devices for transmitting the electromagnetic wave and for receiving the electromagnetic wave may also be different.

Figure 5A:
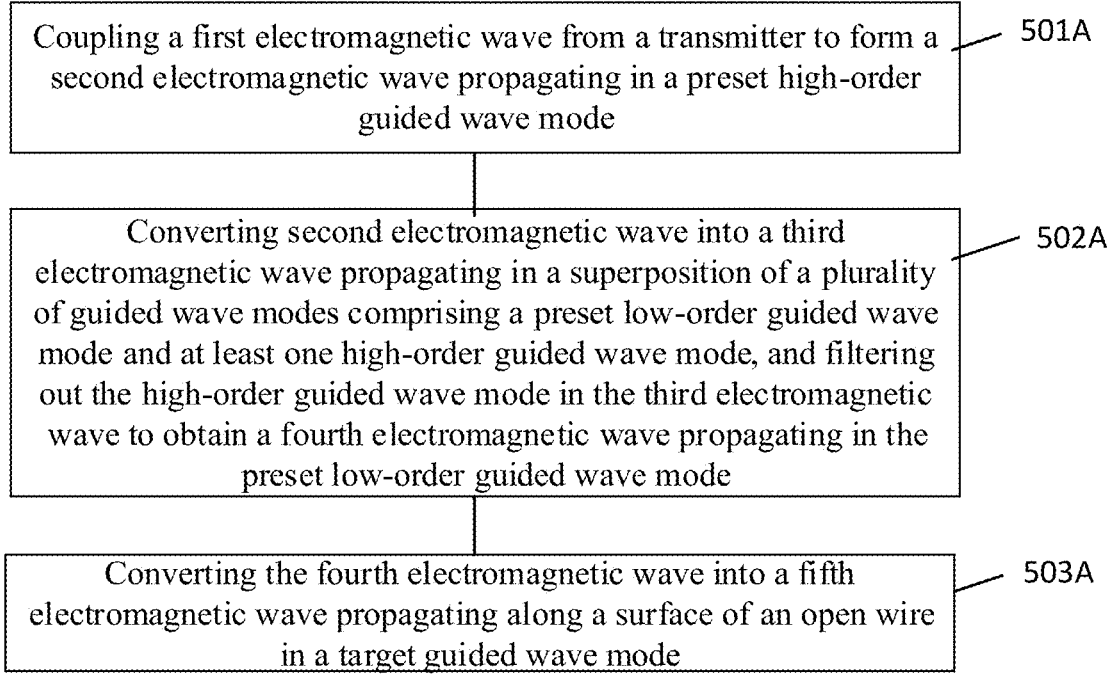
FIG. 5A is a flowchart illustrating a surface wave coupling method according to an embodiment of the present disclosure.

As shown in FIG. 5A, an embodiment of the present disclosure provides a surface wave coupling method, including:

Step 501A, coupling a first electromagnetic wave from a transmitter to form a second electromagnetic wave propagating in a preset high-order guided wave mode;

Step 502A, converting the second electromagnetic wave into a third electromagnetic wave propagating in a plurality of superimposed guided wave modes including a preset low-order guided wave mode and at least one high-order guided wave mode, filtering out the high-order guided wave mode in the third electromagnetic wave to obtain a fourth electromagnetic wave propagating in the preset low-order guided wave mode;

Step 503A: converting the fourth electromagnetic wave into a fifth electromagnetic wave propagating along a surface of an open wire in a target guided wave mode.

The coupling method according to the embodiments of the present disclosure converts and filters the electromagnetic wave to obtain a pure guided wave mode and then couples it to the open wire, which improves effective transmission energy and reduces crosstalk.

Figure 5B:
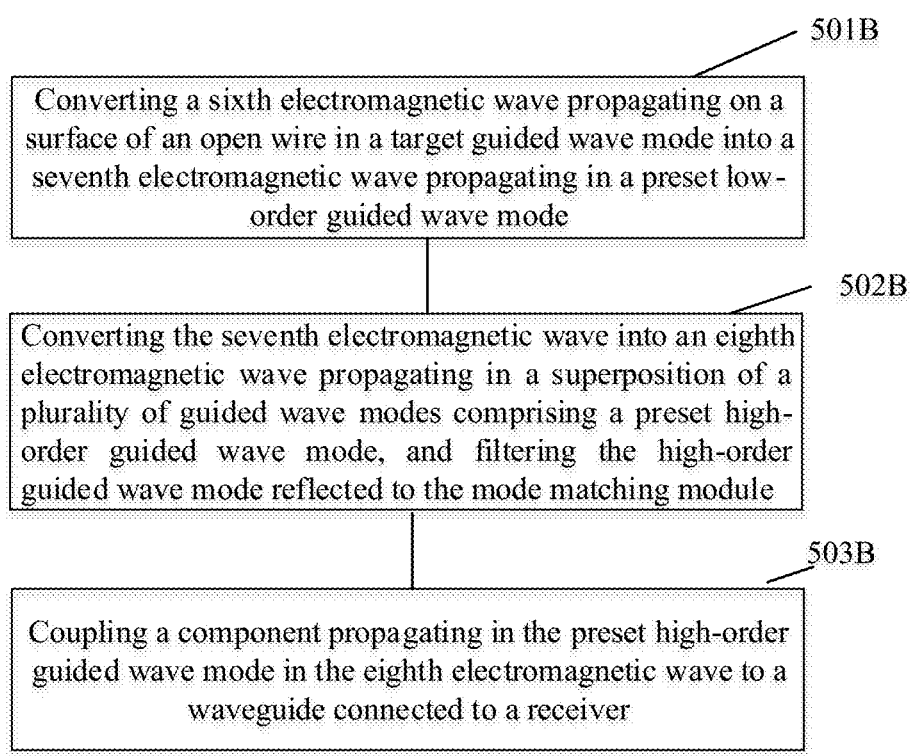
FIG. 5B is a flowchart illustrating a surface wave coupling method according to another embodiment of the present disclosure.

Utilizing the reciprocal characteristics of a passive device and system, the coupling device shown in FIG. 4A may be used to receive and couple the specified surface wave mode on the open wire into the receiver. The method used is an inverse process of the method shown in FIG. 5A. As shown in FIG. 5B, an embodiment of the present disclosure provides a surface wave coupling method, including:

Step 501B, converting a sixth electromagnetic wave propagating on a surface of an open wire in a target guided wave mode into a seventh electromagnetic wave propagating in a preset low-order guided wave mode;

Step 502B, converting the seventh electromagnetic wave into an eighth electromagnetic wave propagating in a superposition of a plurality of guided wave modes including a preset high-order guided wave mode, and filtering the high-order guided wave mode reflected to the mode matching module;

Step 503B, coupling a component propagating in the preset high-order guided wave mode in the eighth electromagnetic wave to a waveguide connected to a receiver.

The embodiments of the present disclosure are described below through application examples.

Application Example 1

Figure 6A:
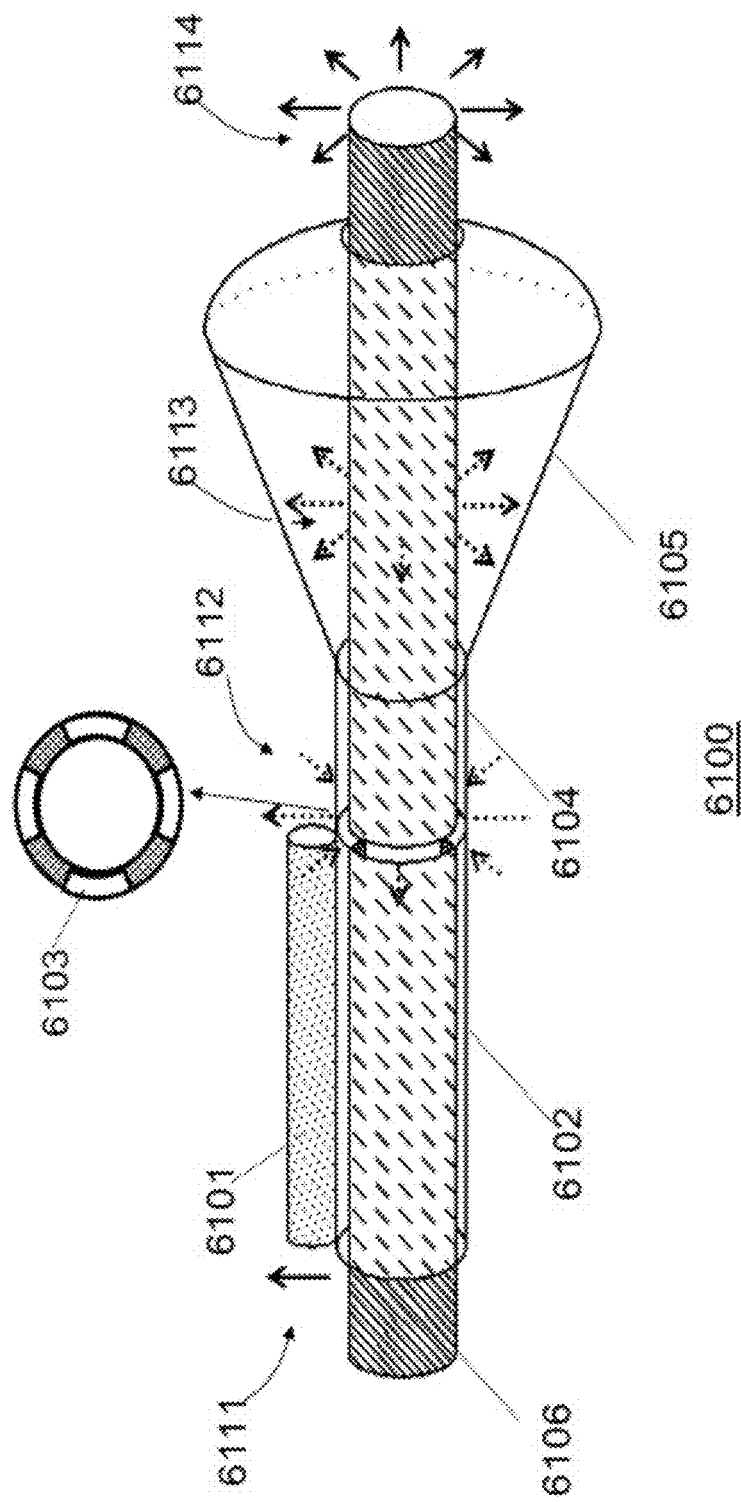
FIG. 6A to FIG. 6D are schematic diagrams illustrating several coupling devices employed in application examples of the present disclosure.

FIG. 6A is an application example of the coupling device proposed by the present disclosure. Assuming that the target guided wave mode is the Sommerfeld wave 210 in the bare metal wire or the TM00 mode 220 in the Goubau line, the coupling device may be composed of the following parts: a polyethylene-filled metal cavity waveguide 6101 (that is, the pillar waveguide 411 in the previous embodiment), a metal coaxial waveguide 6102 (that is, the first coaxial waveguide), a ring grid 6103 composed of metal (such as copper foil) with transparency being changed in four cycles in the azimuthal direction, a air-filled metal coaxial waveguide 6104 (ie, the second coaxial waveguide) immediately following the ring grid 6103, an azimuthally symmetrical lens 6105 made from polyethylene material and an open wire 6106. Wherein, the polyethylene-filled metal cavity waveguide 6101 and the polyethylene-filled metal coaxial waveguide 6102 constitute the high-order mode direct coupling module 410; the ring grid 6103 and the air-filled metal coaxial waveguide 6104 constitute the mode converting and filtering module 420; the azimuthally symmetrical lens 6105 made from polyethylene material constitutes the mode matching module 430. The microwave and millimeter wave from the base station and the micro base station have gone through the following processes in the coupling device.

In the high-order mode direct coupling module 410, the microwave and millimeter wave are coupled to the main mode TE11 mode 6111 in the polyethylene-filled metal cavity waveguide 6101 through the dielectric waveguide (connected to the base station or micro base station); the TE11 mode 6111 in the cavity waveguide 6101 is converted into the TE40 mode 6112 in the polyethylene-filled metal coaxial waveguide 6102 through direct mode coupling. The TE40 mode 6112 is a high-order mode with strong mode discreteness. Therefore, coupling the mode can obtain a good mode purity, and the electrical performance parameters of the filling material polyethylene and the processing error of the waveguide structure have less influence on the coupling effect.

In the mode converting and filtering module 420, after passing through the ring grid 6103 with transparency being changed in four cycles, the TE40 mode 6112 in the coaxial waveguide 6102 is converted into an azimuthally symmetrical TEM mode and a high-order mode with a azimuthal period number being an integer multiple of 4, such as TE40, TE80, etc. Except for the TEM mode, other modes are designed to be the cut-off mode in the air-filled coaxial metal waveguide 6104 and thus reflected back into the polyethylene-filled coaxial metal waveguide 6102. A pure azimuthally symmetrical TEM mode 6113 is obtained at the outlet of the air-filled coaxial metal waveguide 6104.

In the mode matching module 430, the azimuthally symmetrical TEM mode 6113 after spatial filtering will diverge in the radial direction due to diffraction after leaving the air-filled coaxial metal waveguide 6104. By setting the outlet of the coaxial metal waveguide 6104 on the focal plane of the azimuthally symmetrical lens 6105 made from polyethylene material, after the inverse focusing process of the lens 6105, the radially diverging beam of the TEM mode 6113 is transformed into a radially parallel Beam 6114. Finally, after end-face coupling, the radially parallel beam 6114 will be coupled to the designated Sommerfeld wave 210 (bare wire) or TM00 mode 220 (Goubau line) on the open wire 6106.

Application Example 2

Figure 6B:
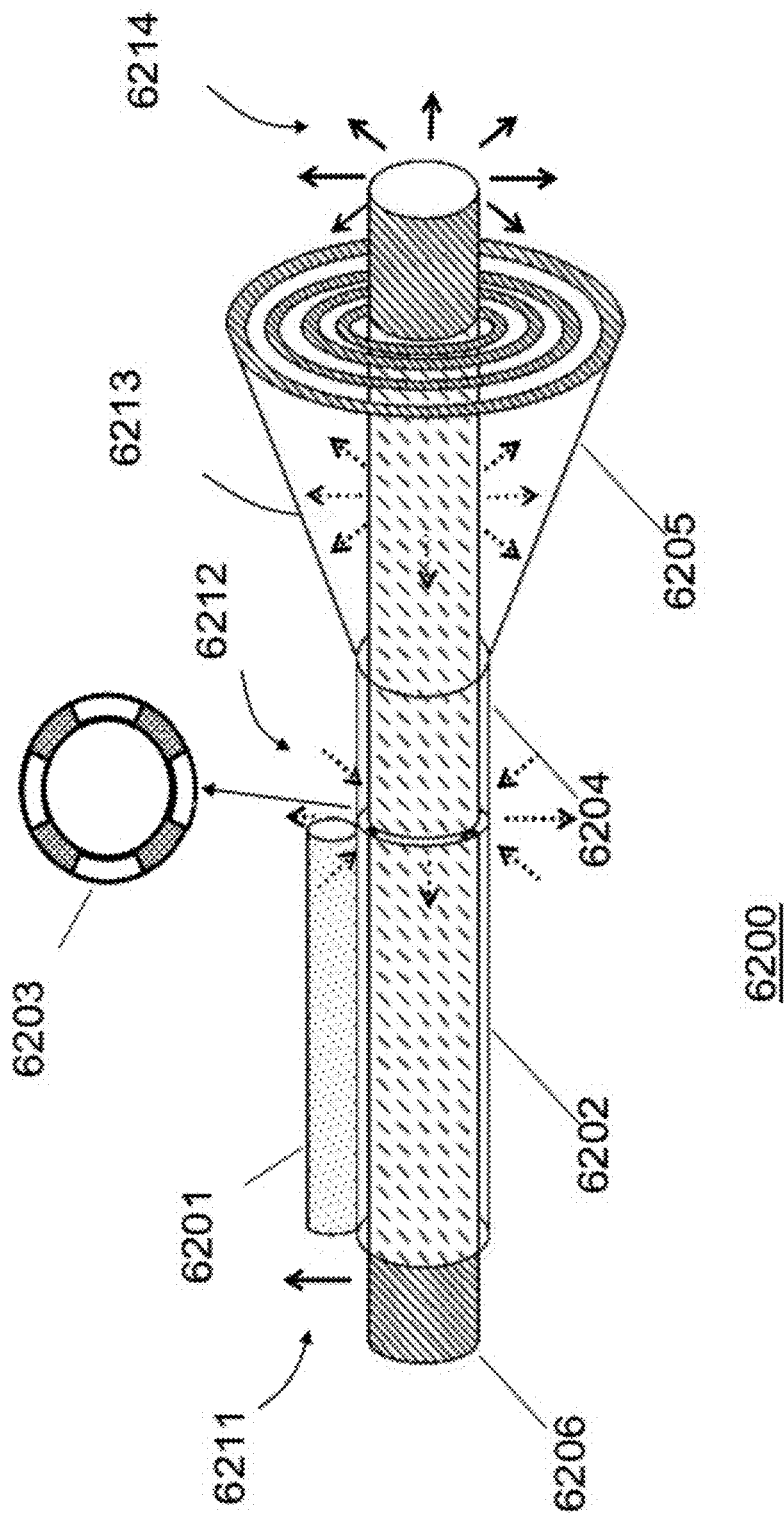

FIG. 6B is another application example of the coupling device proposed by the present disclosure. Assuming that the target guided wave mode is still the Sommerfeld wave 210 in the bare metal wire or the TM00 mode 220 in the Goubau line, the coupling device may be composed of the following parts: a polyethylene-filled metal cavity waveguide 6201, a polyethylene-filled metal coaxial waveguide 6202, a ring grid 6203 composed of copper foil with transparency being changed in four cycles in the azimuthal direction, an air-filled metal coaxial waveguide 6204 immediately following the ring grid 6203, an azimuthally symmetrical Fresnel lens or Fresnel zone plate 6205 with polyethylene supporting material and an open wire 6206. Wherein, the polyethylene-filled metal cavity waveguide 6201 and the polyethylene-filled metal coaxial waveguide 6202 constitute the high-order mode direct coupling module 410; the ring grid 6203 and the air-filled metal coaxial waveguide 6204 immediately following the ring grid 6203 constitute the mode converting and filtering module 420; a module 6205 composed of the Fresnel lens or Fresnel zone plate 6205 with polyethylene supporting material constitutes the mode matching module 430. The microwave and millimeter wave from the base station and the micro base station have gone through the following processes in the coupling device.

In the high-order mode direct coupling module 410, the microwave and millimeter wave are coupled to the main mode TE11 mode 6211 in the polyethylene-filled metal cavity waveguide 6201 through the dielectric waveguide; through direct mode coupling, the TE11 mode 6211 in the metal cavity waveguide 6201 is transformed into the TE40 mode 6212 in the polyethylene-filled metal coaxial waveguide 6202. The TE40 mode 6212 is a high-order mode with strong mode discreteness. Therefore, coupling the mode can obtain a good mode purity, and the electrical performance parameters of the filling material polyethylene and the processing error of the waveguide structure have less influence on the coupling effect.

In the mode converting and filtering module 420, after passing through the ring grid 6203 with transparency being changed in four cycles, the TE40 mode 6212 in the coaxial waveguide 6202 is converted into an azimuthally symmetrical TEM mode and a high-order mode with an azimuthal period number being an integer multiple of 4, such as TE40, TE80, etc. Except for the TEM mode, other modes are designed to be the cut-off mode in the air-filled coaxial metal waveguide 6204 and thus reflected back into the polyethylene-filled coaxial metal waveguide 6202. A pure azimuthally symmetrical TEM mode 6213 is obtained at the outlet of the air-filled coaxial metal waveguide 6204.

In the mode matching module 430, the azimuthally symmetrical TEM mode 6213 after spatial filtering will diverge in the radial direction due to diffraction after leaving the air-filled coaxial metal waveguide 6204. By setting the outlet of the coaxial metal waveguide 6204 at the focal point of the Fresnel lens or Fresnel zone plate 6205 with polyethylene supporting material, using the inverse focusing process of the Fresnel lens or Fresnel zone plate 6205, the radially diverging beam of the TEM mode 6213 is transformed into a radially parallel beam 6214. Finally, after end-face coupling, the radially parallel beam 6214 will be coupled to the Sommerfeld wave 210 on the open wire 6206 (when the open wire 6206 is a bare wire) or TM00 mode 220 (when the open wire 6206 is a Goubau line).

Application Example 3

Figure 6C:
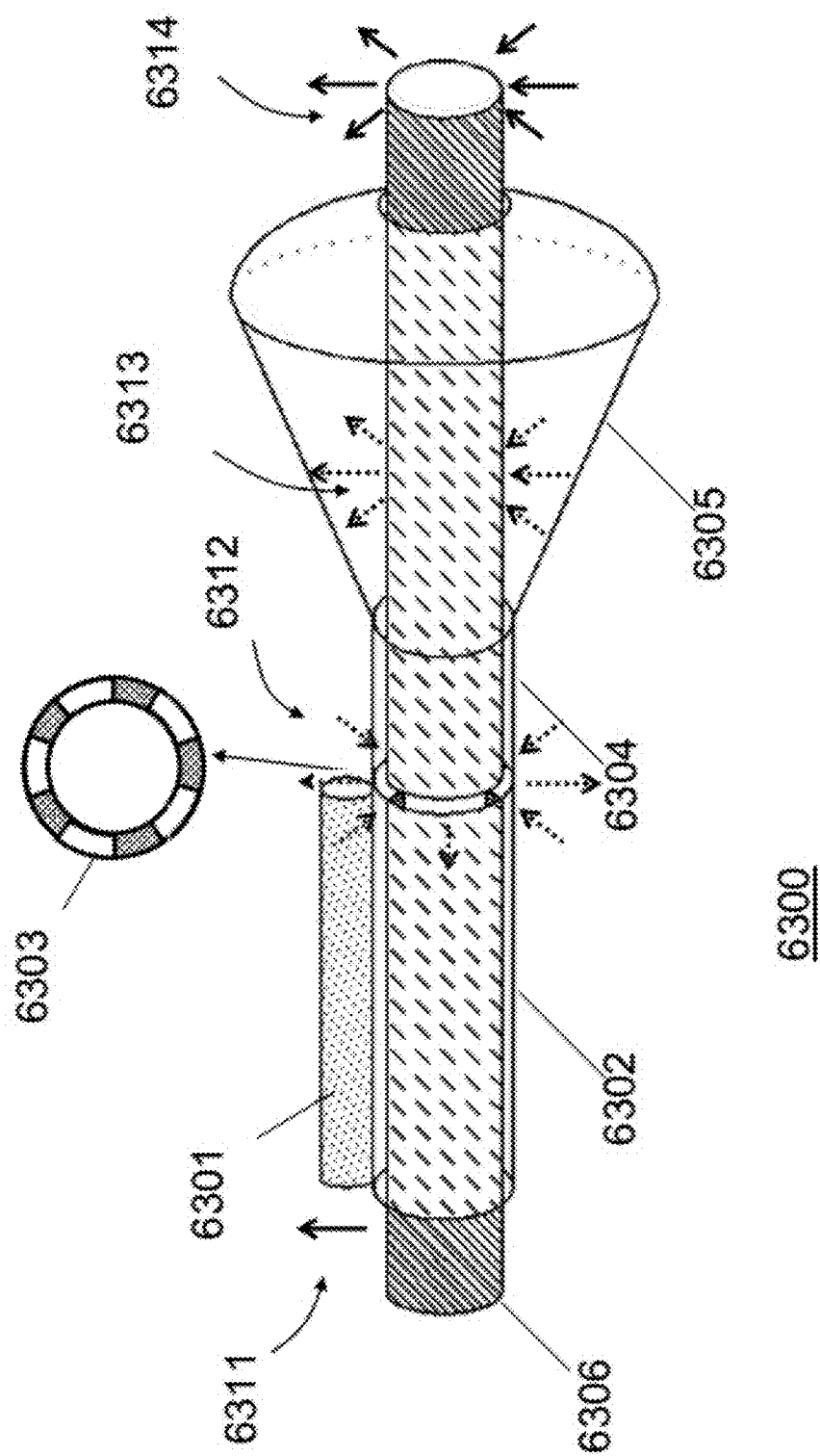

FIG. 6C is another application example of the coupling device of the present disclosure. Assuming that the target guided wave mode is the HE10 mode 230 in the Goubau line, the coupling device may be composed of the following parts: a polyethylene-filled metal cavity waveguide 6301, a polyethylene-filled metal coaxial waveguide 6302, a ring grid 6303 composed of copper foil with transparency being changed in five cycles in the azimuthal direction, a air-filled metal coaxial waveguide 6104 immediately following the ring grid 6303 and an azimuthally symmetrical lens 6305 made from polyethylene material and an open wire 6206. Wherein, The polyethylene-filled metal cavity waveguide 6301 and the polyethylene-filled metal coaxial waveguide 6302 constitute the high-order mode direct coupling module 410; the ring grid 6303 and the air-filled metal coaxial waveguide 6304 immediately following the ring grid 6303 constitute the mode converting and filtering module 420; an azimuthally symmetric lens 6305 made from polyethylene material constitutes the mode matching module 430. The microwave and millimeter wave from the base station and the micro base station have gone through the following processes in the coupling device.

In the high-order mode direct coupling module 410, the microwave and millimeter wave are coupled to the main mode TE11 mode 6311 in the polyethylene-filled metal cavity waveguide 6301 through the dielectric waveguide; through direct mode coupling, the TE11 mode 6311 in the metal cavity waveguide 6301 is transformed into the TE40 mode 6312 in the polyethylene-filled metal coaxial waveguide 6302. The TE40 mode 6312 is a high-order mode with strong mode discreteness. Therefore, coupling the mode can obtain a good mode purity, and the electrical performance parameters of the filling material polyethylene and the processing error of the waveguide structure have less influence on the coupling effect.

In the mode converting and filtering module 420, the TE40 mode 6312 in the coaxial waveguide 6302 is transformed into the superposition of TE10, TE40, TE60 and other modes after passing through the ring grid 6303 with transparency being changed in five cycles. Except for the TE10 mode, the other modes are designed as the cut-off mode in the air-filled coaxial metal waveguide 6304 and are reflected back into the polyethylene-filled coaxial metal waveguide 6302. As a result, a pure TE10 mode 6313 is obtained at the outlet of the air-filled coaxial metal waveguide 6304.

In the mode matching module 430, the TE10 mode 6313 after spatial filtering will diverge in the radial direction due to diffraction after leaving the air-filled coaxial metal waveguide 6304. By setting the outlet of the coaxial metal waveguide 6304 at the focal point of the azimuthally symmetrical lens 6305 made from polyethylene material, using the inverse focusing process of the lens 6305, the radially diverging beam of the TE10 mode 6313 is transformed into a radially parallel beam 6314. Finally, after end-face coupling, the radially parallel beam 6314 will be coupled to the designated HE10 mode on the open wire 6306.

Application Example 4

Figure 6D:
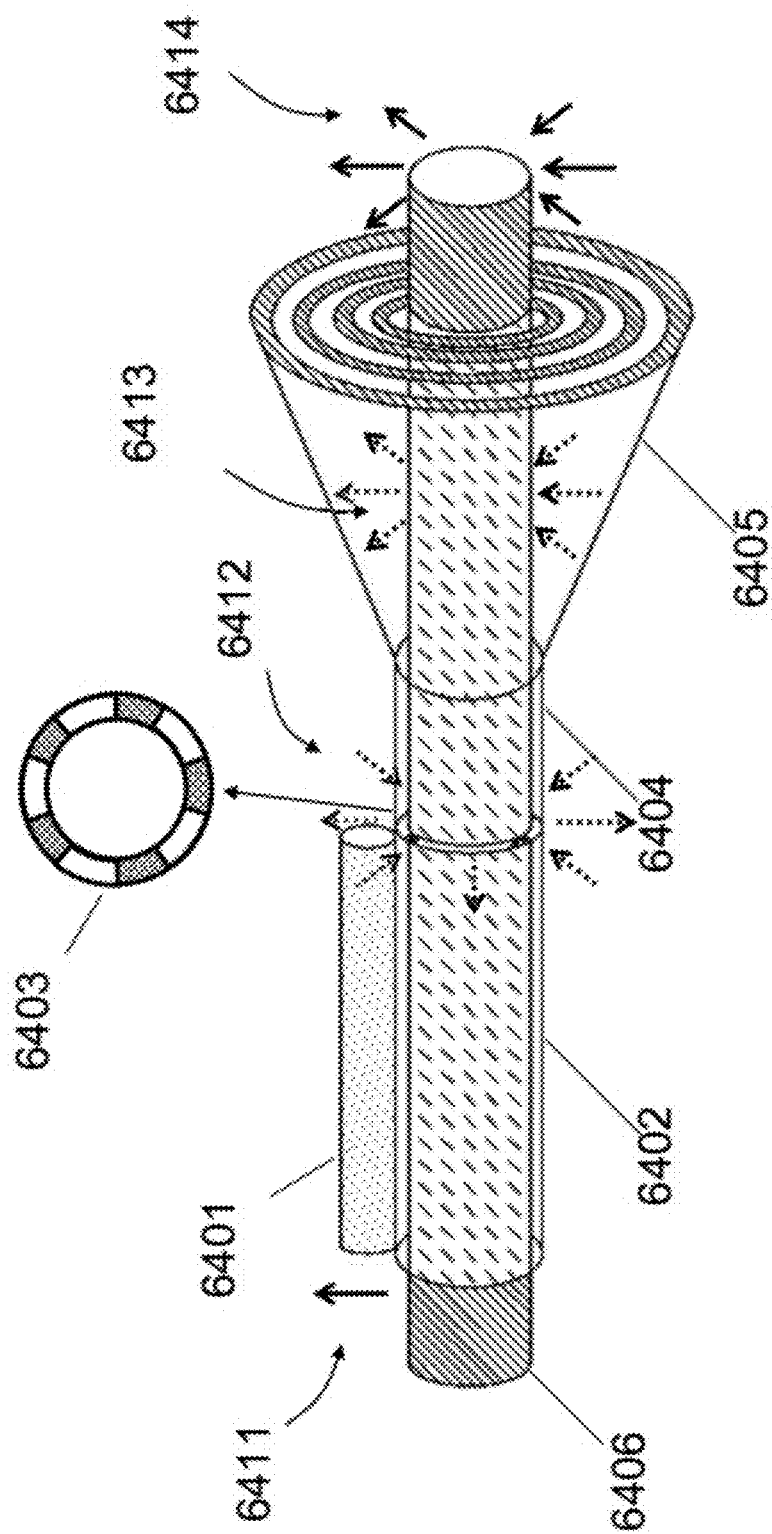

FIG. 6D is another application example of the coupling device according to the present disclosure. Assuming that the target guided wave mode is the HE10 mode 230 in the Goubau line, the coupling device may be composed of the following parts: a polyethylene-filled metal cavity waveguide 6401, a polyethylene-filled metal coaxial waveguide 6402, a ring grid 6403 composed of copper foil with transparency being changed in five cycles in the azimuthal direction, an air-filled metal coaxial waveguide 6404 immediately following the ring grid 6403, an azimuthally symmetrical Fresnel lens or Fresnel zone plate 6405 with polyethylene supporting material and an open wire 6406. Wherein, the polyethylene-filled metal cavity waveguide 6401 and the polyethylene-filled metal coaxial waveguide 6402 constitute the high-order mode direct coupling module 410; the ring grid 6403 and the air-filled metal coaxial waveguide 6404 immediately following the ring grid 6403 constitute the mode converting and filtering module 420; the azimuthally symmetrical Fresnel lens or Fresnel zone plate 6405 with polyethylene supporting material constitutes the mode matching module 430. The microwave and millimeter wave from the base station and the micro base station have gone through the following processes in the coupling device.

In the high-order mode direct coupling module 410, the microwave and millimeter wave are coupled to the main mode TE11 mode 6411 in the polyethylene-filled metal cavity waveguide 6401 through the dielectric waveguide; through direct mode coupling, the TE11 mode 6411 in the metal cavity waveguide 6401 is transformed into the TE40 mode 6412 in the polyethylene-filled metal coaxial waveguide 6202. The TE40 mode 6412 is a high-order mode with strong mode discreteness. Therefore, coupling the mode can obtain a good mode purity, and the electrical performance parameters of the filling material polyethylene and the processing error of the waveguide structure have less influence on the coupling effect.

In the mode converting and filtering module 420, the TE40 mode 6412 in the coaxial waveguide 6402 is transformed into the superposition of TE10, TE40, TE60 and other modes after passing through the ring grid 6403 with transparency being changed in five cycles. Except for the TE10 mode, the other modes are designed as the cut-off mode in the air-filled coaxial metal waveguide 6404 and are reflected back into the polyethylene-filled coaxial metal waveguide 6402. As a result, a pure TE10 mode 6413 is obtained at the outlet of the air-filled coaxial metal waveguide 6404.

In the mode matching module 430, the TE10 mode 6413 after spatial filtering will diverge in the radial direction due to diffraction after leaving the air-filled coaxial metal waveguide 6404. By setting the outlet of the coaxial metal waveguide 6404 at the focal point of the Fresnel lens or Fresnel zone plate 6405, using the inverse focusing process of the Fresnel lens or Fresnel zone plate 6405, the radially diverging beam of the TE10 mode 6413 is transformed into a radially parallel beam 6414. Finally, after end-face coupling, the radially parallel beam 6314 will be coupled to the designated HE10 mode on the open wire 6406.

The above four application embodiments are just exemplary demonstrations of the coupling device, rather than a limitation to this type of device. The coupling devices shown can all achieve efficient excitation of other specified surface wave modes on the open wire in a similar manner. The cavity waveguides 6101, 6201, 6301, 6401 and the metal coaxial waveguides 6101, 6202, 6302, 6402 in the high-order mode direct coupling module, and the TE11 mode and TEm0 mode transmitted therein are not limitations to this type of coupling device. In one embodiment, the cavity waveguides 6101, 6201, 6301, 6401 may be dielectric waveguides; in another embodiment, the metal coaxial waveguides 6102, 6202, 6302, 6402 may also be the coaxial waveguides composed of metal inner wall and dielectric.

It is worth mentioning that high-order guided wave modes produce reflection by the cut-off in the air-filled metal coaxial waveguides 6104, 6204, 6304 and 6404, and eventually produce return loss in the metal coaxial waveguides

6104, 6204, 6304 and 6404. The coaxial waveguides 6102, 6202, 6302, 6402 and metal waveguides 6101, 6201, 6301, 6401 are similar to a back cavity in the probe-excited coaxial-waveguide conversion structure, and adjusting their lengths can optimize the return loss. Of course, other multi-section transmission lines or matching circuits can also serve to reduce the return loss.

In general, by first coupling to a higher-order guided wave mode, converting and filtering the higher-order guided wave mode, the target guided wave mode (weakly constrained surface wave mode) on the open wire can be obtained, and this coupling method can solve the ineffective coupling in the direct coupling mode caused by the degeneracy of weakly constrained surface wave modes. This coupling method is particularly suitable for the case where the diameter of the power line is large (D>λ). Considering that the real power line usually has a large radius, the coupling device and method proposed in this application have strong practicability.

Utilizing the reciprocity characteristics of the passive device and the system, the coupling device shown in the above four examples may be used for receiving, and the target guided wave mode on the open wire is coupled to the receiver. The steps involved are the inverse process of the process described in the above four examples, and will not be repeated here.

The problem of coupling the microwave and millimeter wave signals from base stations and micro base stations to the power lines is solved. The low-loss surface wave mode transmitted on the open wire can realize the backhaul of the microwave and millimeter wave signals between the micro base stations. On this basis, a set of open wire surface wave wireless network coverage system can be constructed. Compared with the traditional macro base station coverage scheme, the open wire surface wave wireless network coverage scheme has the characteristics of high data rate, wide effective coverage and easy deployment. It will play a positive role in promoting the development of 5G communication technology and the deployment of 5G base stations.

Application Example 5

Figure 7:
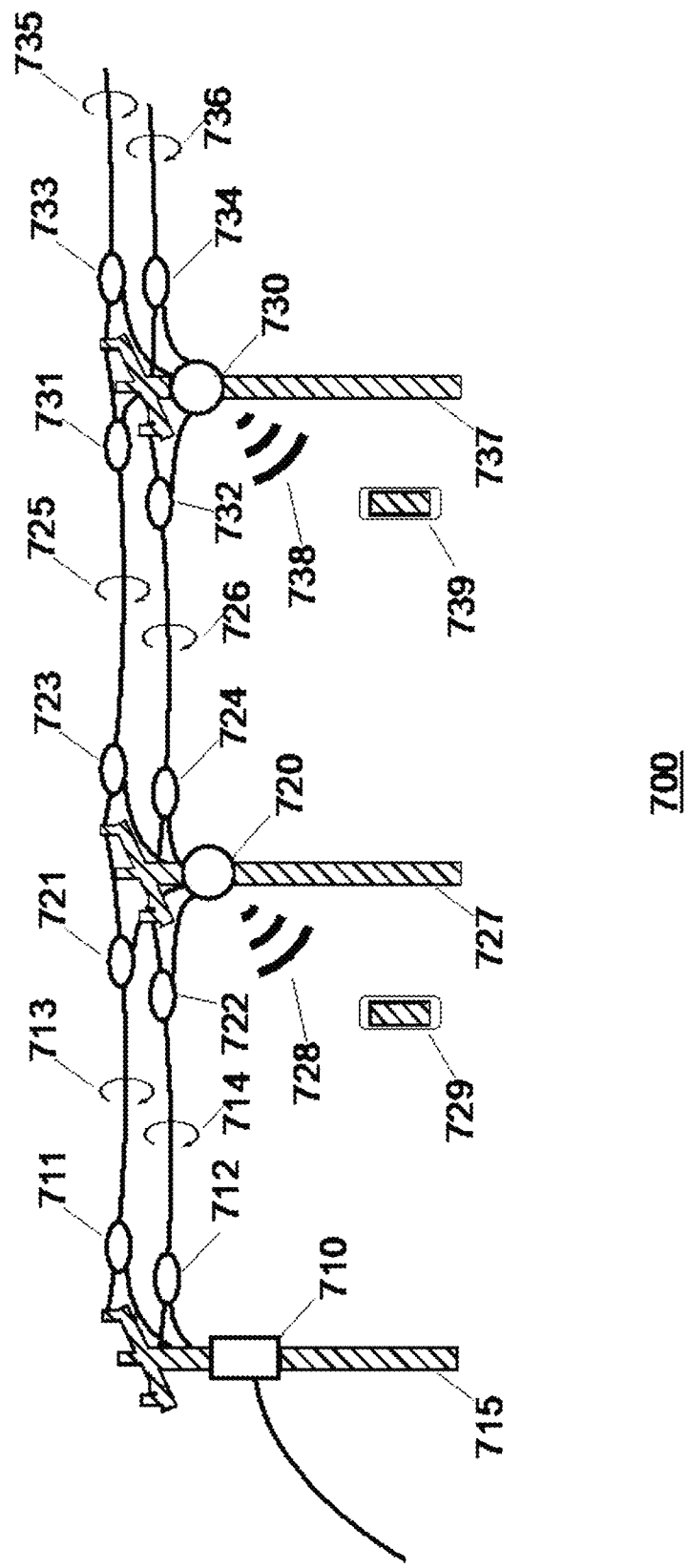
FIG. 7 is a schematic diagram illustrating an open wire surface wave wireless coverage system used in an application example of the present disclosure.

FIG. 7 shows an application example of the open wire surface wave wireless network coverage scheme. In this example, the open wire is a power wire. At this time, the open wire surface wave wireless network coverage scheme may be called a power line wireless network coverage scheme. As shown in FIG. 7, the system includes a main base station, several micro base stations and a plurality of coupling devices. First consider the case of using a single power line for backhaul. A main base station 710 on a main line pole 715 is communicatively coupled to a cell of the cellular network or a site on the Internet, and the signals therein are loaded on the microwave and millimeter wave signals through modulation. The main base station 710 is connected to the coupling device 711 through waveguide, and is coupled to a specified weakly constrained surface wave mode 713 (that is, the target guided wave mode) on the power line through the coupling device 711, and then is coupled to the secondary micro base station 720 on a branch pole 727 through the coupling device 721 (the micro base station 720 and the coupling device 721 are connected by a waveguide, and there is a waveguide connection between the subsequent micro base station and the coupling device, which will not be described again), the micro base station 720 processes the signal and extracts some information from it and converts the information into a microwave or millimeter signal 728 (for example, a WIFI signal) to be transmitted to the user equipment 729 near the micro base station 720. The remaining signals extracted by the micro base station 720 are converted into microwave and millimeter wave signals, the microwave and millimeter wave signals are coupled to the specified weakly constrained surface wave mode 725 through a coupling device 723, and then transmitted to the other secondary micro station 730 in the branch via the coupling device 731. Similarly, the micro base station 730 also processes and extracts signals, and transmits the information to nearby user equipment 739 by converting into microwave and millimeter wave signals 738 (such as WIFI signals). The remaining information extracted by the micro base station 730 is again converted into microwave and millimeter wave signals, the microwave and millimeter wave signals are coupled to the specified weakly constrained surface wave mode 735 in the power line through the coupling device 733, and transmitted to the next micro base station. The cycle repeats and the microwave and millimeter signals can achieve large-scale coverage along the power line. Since the deployment of power lines generally bypasses buildings, when the microwave and millimeter signals are transmitted along power lines, there will be almost no obstacles. This solves the problems encountered in the coverage of microwave and millimeter wave macro base stations, such as buildings, mountains, woods and tunnels and other large obstacles. At the same time, the power line itself can provide power for the main base station 710 and the secondary micro base stations 720, 730, etc., and the telegraph poles are already deployed, which will help to reduce the difficulty of deploying microwave and millimeter wave base stations.

It is worth mentioning that 713, 714, 725, 726, 735, and 736 in FIG. 7 represent weakly constrained surface waves, not the true distribution and direction of the surface wave mode field. These weakly constrained surface wave modes may be any of the Sommerfeld wave (bare metal wire) and the surface wave mode (Goubau line) having frequency close to the cut-off frequency as shown in FIG. 2.

In another embodiment, the main base station 710 may not be connected to the coupling device, but a micro base station is deployed on the telegraph pole 715, and a communication connection is established between the main base station and the micro base station (wired or wireless).

The power line wireless coverage scheme shown in FIG. 7 can have the same wide coverage as the macro coverage base station, except that its access antennas are distributed on the poles instead of concentrated on the base station side. Therefore, this kind of coverage scheme may also be called a power line distributed antenna coverage scheme.

Compared with the power line wireless network coverage scheme introduced by AT&T, the open wire surface wave wireless coverage schemes provided in the above examples use a pure designated surface wave mode for backhaul between base stations, so the efficiency and controllability are higher and the cost is reduced. Compared with the millimeter wave macro base station coverage system, the system has the advantages of wide coverage and easy deployment, which will play a positive role in increasing the speed of regional networks, especially those in economically underdeveloped areas.

Application Example 6

Utilizing various weakly constrained surface wave modes on a single power line and the weakly constrained surface wave modes on a plurality of power lines can achieve Multiple Input Multiple Output (that is, MIMO) of microwave and millimeter wave signals in base stations and micro base stations, thereby expanding data transmission capacity.

Taking two power lines as an example, the main base station 710 on the main line pole 715 is communicatively coupled to a cell of the cellular network or a site on the Internet, and the signals therein are loaded on two microwave and millimeter wave signals through modulation, and are coupled to the specified weakly constrained surface wave modes 713 and 714 on the power line through the coupling devices 711 and 712, respectively, and then are coupled to the secondary micro base station 720 on the branch pole 727 through the coupling devices 721 and 722, respectively. At this time, combined with the MIMO vector demodulation algorithm, the micro base station 720 extracts two signals, converts them into microwave or millimeter wave signals 728 (such as WIFI signals) and transmits the signals 728 to the user equipment 729 near the micro base station 720. The remaining signals extracted by the micro base station 720 are converted into two microwave and millimeter wave signals through the MIMO vector modulation algorithm, and are coupled to the specified weakly constrained surface wave modes 725 and 726 through the coupling devices 723 and 724, respectively, and then transmitted to another secondary micro base station 730 in the branch through the coupling device 731 and 732. Similarly, combined with the MIMO vector demodulation algorithm, the micro base station 730 also processes and extracts the two signals, and transmits the information to the nearby user equipment 739 by converting them into microwave and millimeter wave signals 738 (such as WIFI signals). The remaining information extracted by the micro base station 730 is again converted into two microwave and millimeter wave signals, and are coupled into the weakly constrained surface wave modes 735 and 736 in the power line through the coupling devices 733 and 734, respectively, and transmitted to the next micro base station. This coupling scheme needs high isolation between the weakly constrained surface wave modes on the two power lines to ensure the effectiveness of the MIMO vector modulation and demodulation algorithm. Under common pole pitch sizes, the isolation between weakly constrained surface wave modes on adjacent power lines can meet the requirements of MIMO vector modulation and demodulation algorithms in most cases.

The previous paragraph shows an example of using weakly constrained surface wave modes on two power lines to realize dual-channel microwave and millimeter wave signals for backhaul. It can be naturally realized that using a plurality of power lines and various orthogonal modes in the power lines, more channels of input and output may be achieved, thereby further improving the return data transmission rate.

Application Example 7

Figure 8:
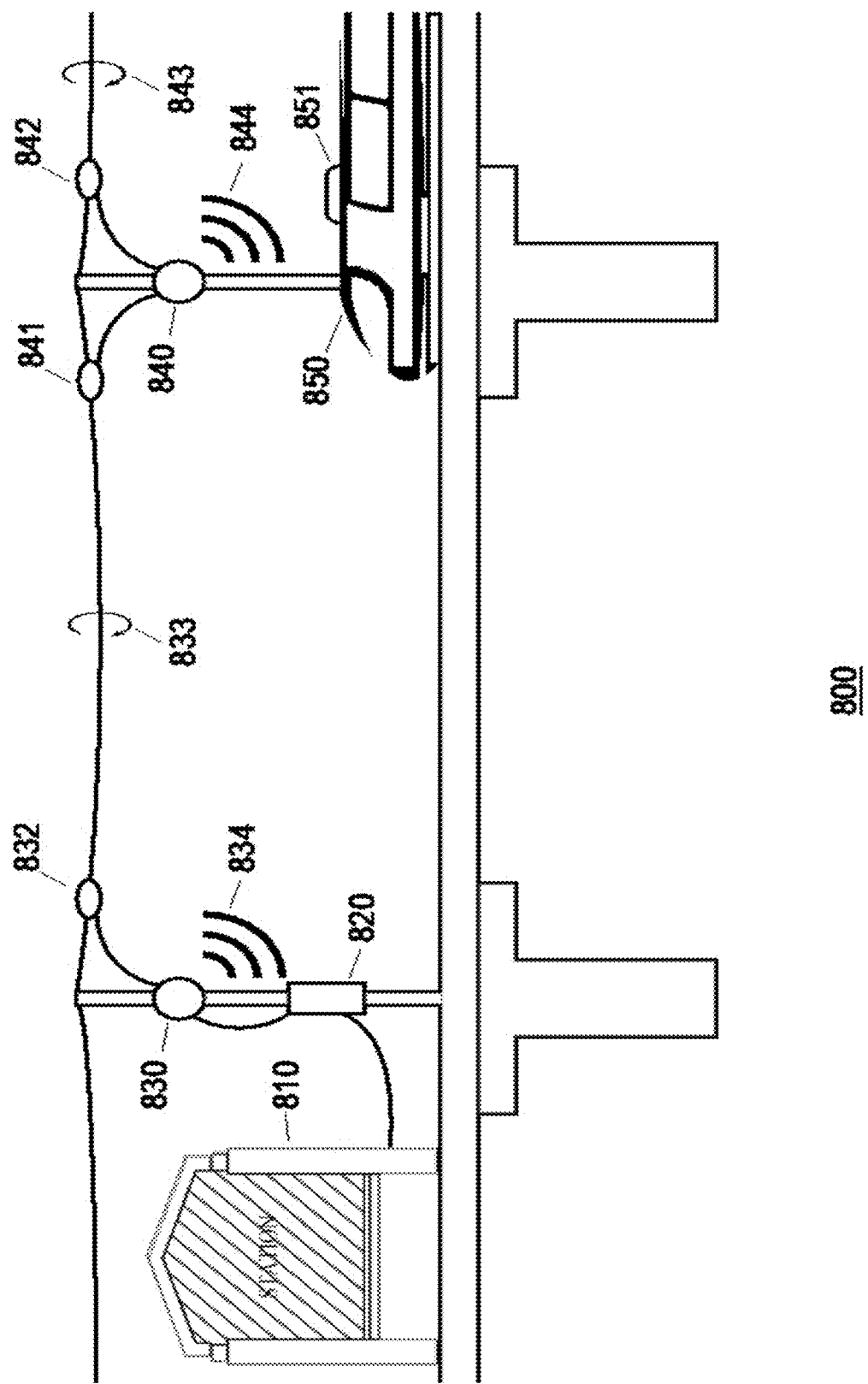
FIG. 8 is a schematic diagram illustrating a wireless coverage system employing surface waves of railway open wire used in an application example of the present disclosure.

FIG. 8 is a schematic diagram of another application example of surface wave wireless network coverage. In this embodiment, the open wire surface wave wireless network coverage system is provided in the railway line. Through the line including various cables that provide electricity for high-speed rail, high-speed trains and subways, the system can provide high-speed network services for passengers in the carriages. As shown in FIG. 8, the railway open wire surface wave wireless network coverage system 800 is composed of a main base station 820 and a plurality of secondary micro base stations 830, 840 that are communicatively coupled to the Internet and circuit switching network nodes in the station 810. The main base station 820 obtains baseband data from the Internet and circuit switching network nodes of the station 810 and converts it into microwave and millimeter wave signals through the transceiver link. Subsequently, the first secondary micro base station 830 partially converts the microwave and millimeter wave signals into wireless signals 834 (also in the microwave and millimeter wave frequency bands), and the signals 834 is partially coupled to the specified weakly constrained surface wave mode 833 on the open wire through the coupling device 832. The weakly constrained surface wave mode 833 couples the signal to the second secondary micro base station 840 through the coupling device 841, and after being amplified, it is partially converted into a wireless signal 844 in the microwave and millimeter wave frequency bands. The remaining part is coupled to the specified weakly constrained surface wave mode 843 through the coupling device 842 again. The cycle repeats, and the coverage of microwave and millimeter wave signals on the railway line between the two sites can be achieved. The Customer Premise Equipment 851 (CPE) installed on the train 850, after receiving the microwave and millimeter wave wireless signals 834 and 844 transmitted by the micro base station, converts them into wireless signals such as WIFI signals and distributes them in the train for connecting user equipment.

If the area near the telephone pole is used as a unit of the cell, the train will traverse the coverage of a plurality of cells in a short time, causing frequent handovers between the cells, which will greatly reduce the network performance. Therefore, these cells need to be combined to form a "super cell" to cover a larger area.

We can take the entire section of the railway between two stations as the coverage of the "super cell", that is, on the entire section of the railway between the two stations, the wireless signals 834, 844, etc. sent by the micro base stations 830, 840, etc. and the weakly constrained surface wave signals 833 and 843 sent on the power line are all the same kind of signals in the same frequency band, which are the microwave and millimeter wave signals sent by the main base station 820. The micro base stations 830 and 840 are equivalent to a repeater, and only perform simple processing such as amplification and power distribution on the microwave and millimeter wave signals. One part covers the lineside by wireless signals 834 and 844, etc., and the other part is coupled to the power line for coverage of the next section. In this case, the transmission and reception frequency range of the customer terminal equipment (CPE) 851 on the high-speed train 850 also corresponds to the microwave and millimeter wave frequency range sent by the main base station 820. Since it only plays the role of relaying microwave and millimeter wave signals, the production cost of micro base stations will be significantly reduced, which will help to reduce the deployment cost of the entire network.

Like the common wireless coverage scheme employing power line shown in FIG. 7, the open wire surface wave wireless coverage scheme can also use a plurality of power lines to achieve Multiple Input Multiple Output (MIMO) of weakly constrained surface wave return signals. In this case, channels and modules are needed to the micro base station 830, 840 and to solve the module of MIMO.

In this example, open wires on the railway are used to achieve high-speed network coverage for trains. This solution will effectively improve the Internet experience of users in high-speed railways, high-speed trains, and subway cars.

The duplex mode of the open wire surface wave wireless coverage scheme shown in FIGS. 7 and 8 may be Time Division Duplexing (TDD) or Frequency Division Duplexing (FDD). In particular, due to the stable transmission environment on the power line, the duplex mode of the surface wave backhaul of the micro base station can be full-duplex (Full-Duplex) to further increase the data transmission rate of the backhaul.

Figure 9:
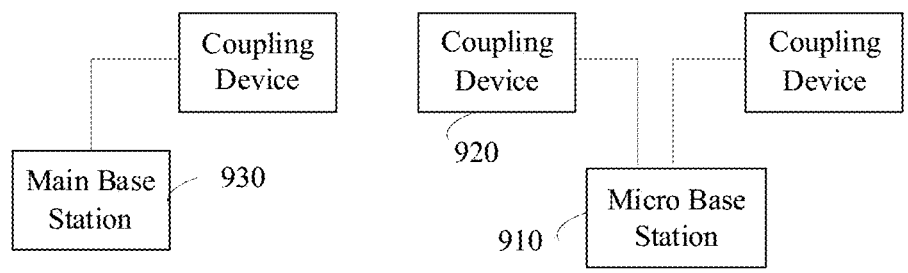
FIG. 9 is a block diagram illustrating an open wire surface wave wireless coverage system according to an embodiment of the present disclosure.

As shown in FIG. 9, based on the above coupling device, an embodiment of the present disclosure provides an open wire surface wave wireless coverage system, which includes at least one micro base station 910 and a plurality of coupling devices 920 according to any one of the embodiments, the micro base station 910 is connected to at least one coupling device 920 through a waveguide, wherein:

the micro base station 910 is configured to send an electromagnetic wave carrying information to the coupling device 920 connected to the micro base station 910 through a waveguide, and to obtain the electromagnetic waves carrying information from the coupling device 920 connected to the micro base station 910;

the coupling device 920 is configured to couple the electromagnetic wave carrying information sent by the micro base station connected to the coupling device, to the open wire to propagate along a surface of the open wire in the target guided wave mode, and couple the electromagnetic wave carrying information propagated on the surface of the open wire to the micro base station connected to the coupling device.

In an embodiment, the micro base station 910 is further configured to establish a connection with a terminal, transmit to the terminal the information extracted from the electromagnetic wave carrying information obtained from the coupling device connected to the micro base station; and receive information uploaded by the terminal, load the information on the electromagnetic wave and send the loaded information to the coupling device connected to the micro base station. That is, the terminal is connected to the network to upload or download information.

Figure 10:
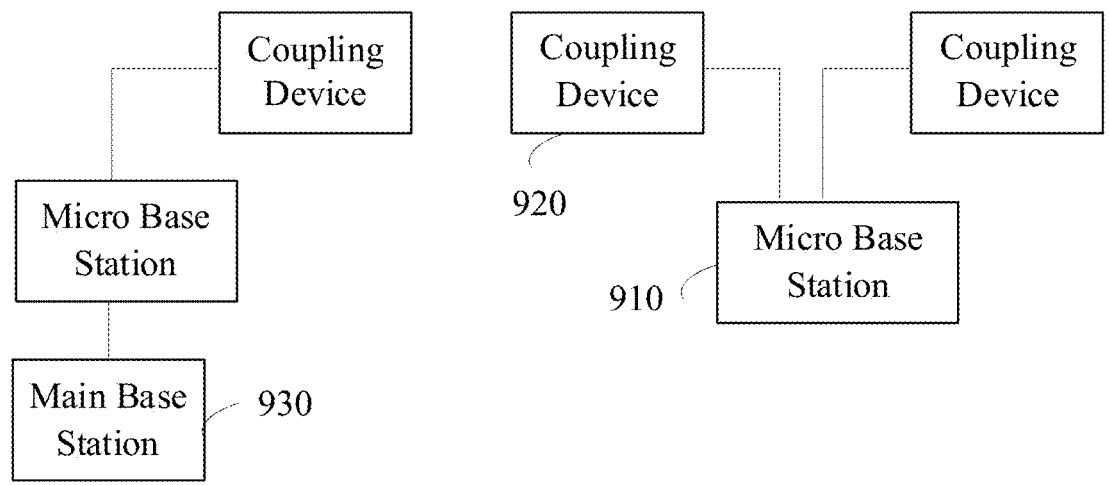
FIG. 10 is a block diagram illustrating an open wire surface wave wireless coverage system according to another embodiment of the present disclosure.

In an embodiment, the open wire surface wave wireless coverage system further includes a main base station 930, which is connected to at least one coupling device 920 via a waveguide (as shown in FIG. 9), or the main base station 930 has a communication connection with the micro base station 910 (as shown in FIG. 10);

The main base station 930 is configured to load information on electromagnetic waves and send the electromagnetic wave loaded with the information to the coupling device 920 connected to the main base station through a waveguide, and receive electromagnetic waves carrying information from the coupling device connected to the main base station; or, send information to the micro base station 910, or receive information from the micro base station 910.

In an embodiment, the micro base station 910 is a relay station, that is, only the received signal is relayed (for basic power amplification, power distribution, etc.), and the micro base station 910 is equivalent to a relay for the terminal to access the network. The main base station 930 controls and manages the wireless access for the terminal.

Compared with the traditional power line surface wave wireless coverage scheme, the open wire surface wave wireless coverage scheme according to the embodiments of the present disclosure is more controllable in the surface wave mode for the backhaul, and can alleviate the received power deterioration caused by inter-mode interference. Since the coupling device only excites the target guided wave mode, the excitation efficiency is higher. The improvement of the performance of the surface wave mode excited on the open wire will eventually improve the quality of the return signal between the base stations.

Although the present disclosure is described in detail above, the present disclosure is not limited thereto, and those skilled in the art can make various modifications according to the principles of the present disclosure. Therefore, all modifications made in accordance with the principles of the present disclosure should be understood as falling within the protection scope of the present disclosure.

A person of ordinary skill in the art can understand that all or some of the steps, functional modules/units in the system, and apparatus in the methods disclosed above can be implemented as software, firmware, hardware and appropriate combinations thereof. In hardware implementations, the division between functional modules/units mentioned in the above description does not necessarily correspond to the division of physical components; for example, a physical component may have a plurality of functions, or a function or step may be cooperatively performed by several physical components. Some or all components may be implemented as software executed by a processor, such as a digital signal processor or a microprocessor, or as hardware, or as an integrated circuit, such as an application specific integrated circuit. Such software may be distributed on a computer-readable medium, and the computer-readable medium may include a computer storage medium (or a non-transitory medium) and a communication medium (or a transitory medium). As is well known to those of ordinary skill in the art, the term computer storage media includes volatile and nonvolatile, removable and non-removable media implemented in any method or technology for storing information (such as computer-readable instructions, data structures, program modules, or other data). Computer storage media include but are not limited to RAM, ROM, EEPROM, flash memory or other storage technologies, CD-ROM, digital versatile disk (DVD) or other optical disk storage, magnetic cassettes, tapes, magnetic disk storage or other magnetic storage devices, or any other medium that is used to store desired information and can be accessed by a computer. In addition, as is well known to those of ordinary skill in the art, communication media usually contain computer-readable instructions, data structures, program modules, or other data in a modulated data signal such as carrier waves or other transmission mechanisms, and may include any information delivery media.

What is claimed is:

1. A coupling device, comprising:
   a high-order mode direct coupling module configured to couple a first electromagnetic wave from a transmitter to form a second electromagnetic wave propagating in a preset high-order guided wave mode;
   a mode converting and filtering module configured to convert the second electromagnetic wave into a third electromagnetic wave propagating in a superposition of a plurality of guided wave modes including a preset low-order guided wave mode and at least one high-order guided wave mode, and to filter out the high-order guided wave mode in the third electromagnetic wave to obtain a fourth electromagnetic wave propagating in the preset low-order guided wave mode; and
   a mode matching module configured to convert the fourth electromagnetic wave into a fifth electromagnetic wave propagating along a surface of an open wire in a target guided wave mode.

2. The coupling device of claim 1, wherein, the high-order mode direct coupling module comprises a pillar waveguide and a first coaxial waveguide disposed close to each other, wherein the pillar waveguide is parallel to the first coaxial waveguide, two end faces of the pillar waveguide are respectively aligned with two end faces of the first coaxial waveguide, and the first coaxial waveguide wraps the open wire.

3. The coupling device of claim 2, wherein,
the mode converting and filtering module comprises a ring grid and a second coaxial waveguide, wherein, electromagnetic performance parameters of the ring grid are periodically distributed in an azimuthal direction, and the ring grid is located between the first coaxial waveguide and the second coaxial waveguide,
wherein, a size of end faces of the ring grid is the same as that of end faces of the first coaxial waveguide, a size of end faces of the second coaxial waveguide is the same as that of end faces of the first coaxial waveguide, an axis of the ring grid is in consistent with axes of the first coaxial waveguide and the second coaxial waveguide, the ring grid and the second coaxial waveguide wrap the open wire, an end surface of the ring grid is close to an end surface of the second coaxial waveguide, and an end surface of the ring grid is close to an end surface of the first coaxial waveguide.

4. The coupling device of claim 3, wherein a number of cycles of the ring grid is determined according to the target guided wave mode.

5. The coupling device of claim 3, wherein the electromagnetic performance parameters comprise at least one of the following: transmittance and phase difference.

6. The coupling device of claim 3, wherein a surface of the pillar waveguide is an insulating layer or a metal layer; a surface of the first coaxial waveguide is an insulating layer or a metal layer; and a surface of the second coaxial waveguide is a metal layer.

7. The coupling device of claim 3, wherein the mode matching module comprises an azimuthally symmetrical lens, the lens comprises a cylindrical hole for accommodating the open wire, axes of the cylindrical hole are in consistent with the axis of the second coaxial waveguide, the lens is close to the second coaxial waveguide and away from the ring grid, an end face of the second coaxial waveguide away from the ring grid is located on a focal plane of the lens, and a size of an end face of the lens close to the second coaxial waveguide is the same as that of the end face of the second coaxial waveguide.

8. The coupling device of claim 7, wherein the lens is a Fresnel lens, or a Fresnel zone plate, or a lens having a convex end face at an end away from the end face of the second coaxial waveguide.

9. The coupling device of claim 1, wherein the mode matching module converting the fourth electromagnetic wave into the fifth electromagnetic wave propagating along the surface of the open wire in the target guided wave mode comprises: the mode matching module converting the fourth electromagnetic wave into the fifth electromagnetic wave propagating in a direction parallel to the open wire.

10. The coupling device of claim 1, wherein the first electromagnetic wave is a microwave signal or a millimeter wave signal.

11. The coupling device of claim 1, wherein the target guided wave mode is Sommerfeld wave, transverse magnetic TM00 mode or HE10 mode.

12. A coupling device, comprising:
a mode matching module configured to convert a sixth electromagnetic wave propagating in a target guided wave mode into a seventh electromagnetic wave propagating in a preset low-order guided wave mode;
a mode converting and filtering module configured to convert the seventh electromagnetic wave into an eighth electromagnetic wave propagating in a superposition of a plurality of guided wave modes comprising a preset high-order guided wave mode, and filter the high-order guided wave mode reflected to the mode matching module; and
a high-order mode direct coupling module configured to couple a component in the eighth electromagnetic wave propagating in the preset high-order guided wave mode to a waveguide connected to a receiver.

13. An open wire surface wave wireless coverage system, comprising at least one micro base station and a plurality of coupling devices, the micro base station being connected to at least one of the coupling devices through a waveguide,
wherein, each of the plurality of coupling devices comprises:
a high-order mode direct coupling module configured to couple a first electromagnetic wave from a transmitter to form a second electromagnetic wave propagating in a preset high-order guided wave mode;
a mode converting and filtering module configured to convert the second electromagnetic wave into a third electromagnetic wave propagating in a superposition of a plurality of guided wave modes comprising a preset low-order guided wave mode and at least one high-order guided wave mode, and filter the high-order guided wave mode in the third electromagnetic wave to obtain a fourth electromagnetic wave propagating in the preset low-order guided wave mode; and
a mode matching module configured to convert the fourth electromagnetic wave into a fifth electromagnetic wave propagating along a surface of an open wire in a target guided wave mode,
wherein,
the micro base station is configured to send an electromagnetic wave carrying information to the coupling device connected to the micro base station through a waveguide, and obtain an electromagnetic wave carrying information from the coupling device connected to the micro base station; and
the coupling device is configured to couple the electromagnetic wave carrying information sent by the micro base station connected to the coupling device, to the open wire to propagate along a surface of the open wire in a target guided wave mode, and couple the electromagnetic wave carrying information propagating along the surface of the open wire to the micro base station connected to the coupling device.

14. The open wire surface wave wireless coverage system of claim 13, wherein the micro base station is further configured to establish a connection with a terminal; send to the terminal information extracted from the electromagnetic wave carrying information obtained from the coupling device connected to the micro base station; and receive information uploaded by the terminal, load the information on the electromagnetic wave and send the loaded information to the coupling device connected to the micro base station.

15. The open wire surface wave wireless coverage system of claim 14, further comprises a main base station, wherein, the main base station is connected to the at least one of the coupling devices through a waveguide, or, a communication connection is established between the main base station and the micro base station;
the main base station is configured to:

load information on an electromagnetic wave and send the electromagnetic wave loaded with the information to a coupling device connected to the main base station through a waveguide, and receive an electromagnetic wave carrying information from the coupling device connected to the main base station;

or, send information to the micro base station or receive information from the micro base station.

16. The open wire surface wave wireless coverage system of claim 13, further comprises a main base station, wherein, the main base station is connected to the at least one of the coupling devices through a waveguide, or, a communication connection is established between the main base station and the micro base station;

the main base station is configured to:
load information on an electromagnetic wave and send the electromagnetic wave loaded with the information to a coupling device connected to the main base station through a waveguide, and receive an electromagnetic wave carrying information from the coupling device connected to the main base station;
or, send information to the micro base station or receive information from the micro base station.

17. The open wire surface wave wireless coverage system of claim 13, wherein, the high-order mode direct coupling module comprises a pillar waveguide and a first coaxial waveguide disposed close to each other, wherein the pillar waveguide is parallel to the first coaxial waveguide, two end faces of the pillar waveguide are respectively aligned with two end faces of the first coaxial waveguide, and the first coaxial waveguide wraps the open wire.

18. The open wire surface wave wireless coverage system of claim 17, wherein,
the mode converting and filtering module comprises a ring grid and a second coaxial waveguide, wherein, electromagnetic performance parameters of the ring grid are periodically distributed in an azimuthal direction, and the ring grid is located between the first coaxial waveguide and the second coaxial waveguide,
wherein, a size of end faces of the ring grid is the same as that of end faces of the first coaxial waveguide, a size of end faces of the second coaxial waveguide is the same as that of end faces of the first coaxial waveguide, an axis of the ring grid is in consistent with the axes of the first coaxial waveguide and the second coaxial waveguide, the ring grid and the second coaxial waveguide wrap the open wire, an end surface of the ring grid is close to an end surface of the second coaxial waveguide, and an end surface of the ring grid is close to an end surface of the first coaxial waveguide.

19. The open wire surface wave wireless coverage system of claim 18, wherein the mode matching module comprises an azimuthally symmetric lens, the lens comprises a cylindrical hole for accommodating the open wire, the axes of the cylindrical hole are in consistent with the axis of the second coaxial waveguide, the lens is close to the second coaxial waveguide and away from the ring grid, an end face of the second coaxial waveguide away from the ring grid is located on a focal plane of the lens, and a size of an end face of the lens close to the second coaxial waveguide is the same as that of the end face of the second coaxial waveguide.

20. The open wire surface wave wireless coverage system of claim 13, wherein the mode matching module converting the fourth electromagnetic wave into the fifth electromagnetic wave propagating along the surface of the open wire in the target guided wave mode comprises: the mode matching module converting the fourth electromagnetic wave into the fifth electromagnetic wave propagating in a direction parallel to the open wire.

* * * * *